United States Patent
Watano et al.

(10) Patent No.: US 9,933,619 B2
(45) Date of Patent: Apr. 3, 2018

(54) MEMBER FOR PROJECTION IMAGE DISPLAY AND PROJECTION IMAGE DISPLAY SYSTEM

(71) Applicant: FUJIFILM Corporation, Tokyo (JP)

(72) Inventors: Akiko Watano, Kanagawa (JP); Yujiro Yanai, Kanagawa (JP); Yukito Saitoh, Kanagawa (JP); Mitsuyoshi Ichihashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 77 days.

(21) Appl. No.: 14/865,404

(22) Filed: Sep. 25, 2015

(65) Prior Publication Data

US 2016/0091756 A1    Mar. 31, 2016

(30) Foreign Application Priority Data

Sep. 29, 2014 (JP) ................................. 2014-199276

(51) Int. Cl.
*G02B 5/30* (2006.01)
*G02B 27/01* (2006.01)

(52) U.S. Cl.
CPC .......... *G02B 27/0101* (2013.01); *G02B 5/30* (2013.01); *G02B 2027/011* (2013.01); *G02B 2027/0121* (2013.01)

(58) Field of Classification Search
CPC .............. G02B 27/0101; G02B 5/30; G02B 2027/011; G02B 2027/0121; G02F 1/13718; G02F 2201/343
See application file for complete search history.

(56) References Cited

U.S. PATENT DOCUMENTS

| | | | |
|---|---|---|---|
| 5,013,134 A | 5/1991 | Smith | |
| 6,444,280 B1 * | 9/2002 | Matsuoka | G02B 5/3016 252/299.01 |
| 2002/0186474 A1 * | 12/2002 | Weber | G02B 5/22 359/580 |
| 2005/0270655 A1 * | 12/2005 | Weber | G02B 5/305 359/630 |

FOREIGN PATENT DOCUMENTS

| | | |
|---|---|---|
| JP | 2006-512622 A | 4/2006 |
| JP | 2007108732 A * | 4/2007 |
| WO | 2005/017600 A1 | 2/2005 |

* cited by examiner

*Primary Examiner* — Nathanael R Briggs
(74) *Attorney, Agent, or Firm* — Edwards Neils LLC; Jean C. Edwards, Esq.

(57) ABSTRACT

The present invention provides a member for projection image display, including a reflection layer and a retardation layer, wherein the reflection layer includes a cholesteric liquid crystal layer exhibiting selective reflection in a visible light region, the cholesteric liquid crystal layer is a layer formed from a liquid crystal composition containing a discotic liquid crystal compound, and a front phase difference of the retardation layer is in a range of 50 nm to 400 nm; and a projection image display system which includes the above member for projection image display, wherein the retardation layer is disposed on an incident light side relative to the reflection layer, and the incident light is p-polarized light that vibrates in a direction parallel to a plane of incidence, which is capable of displaying a clear image having high reflectance and high transmittance, without a problem of a double image.

21 Claims, 4 Drawing Sheets

MEMBER FOR PROJECTION IMAGE DISPLAY AND PROJECTION IMAGE DISPLAY SYSTEM

CROSS-REFERENCE TO RELATED APPLICATIONS

The present application claims priority under 35 U.S.C § 119 to Japanese Patent Application No. 2014-199276 filed on Sep. 29, 2014, the entire content of which is incorporated by reference into the present application.

TECHNICAL FIELD

The present invention relates to a member for projection image display. More particularly, the present invention relates to a member for projection image display that can be used as a combiner in a head-up display system. The present invention also relates to a projection image display system utilizing the member for projection image display.

BACKGROUND ART

In a projection image display system, an image projected by a projector is displayed by a member for projection image display. For example, in a head-up display system, which is one of projection image display systems, a member for projection image display, which has a function of a combiner capable of displaying simultaneously an image being projected and a scenery ahead, is used. In a head-up display system using a wind shield glass as the member for projection image display, a double image caused by reflection of projection light on the surface or rear surface of glass tends to become remarkable, and various solution methods have conventionally been tried.

For example, in Patent Literature 1, a method of forming, into a wedge-like shape, the cross-section of an intermediate film of a wind shield glass that is a laminated glass, to thereby cause images reflected from glass plates on the outside and inside of a car, respectively, to coincide with each other, is proposed. Many technologies for allowing p-polarized light to enter a glass surface, and for bringing, close to zero, reflected light from the surface of a member for projection image display while utilizing Brewster's angle, to thereby eliminate a double image, are known (for example, Patent Literature 2).

CITATION LIST

Patent Literature

[Patent Literature 1] U.S. Pat. No. 5,013,134
[Patent Literature 2] Published Japanese translation of PCT patent application No. 2006-512622

SUMMARY OF INVENTION

Problems to be Solved

In the technology described in Patent Literature 1, a high technique is required for adjusting the angle between the outside glass plate and the inside glass plate. Furthermore, also in the method of utilizing the Brewster's angle as described in Patent Literature 2, simultaneous securing of sufficient light reflectance and light transmittance together with the elimination of a double image still remains as a problem.

An object of the present invention is to provide a member for projection image display that makes it possible to provide a head-up display system without a problem of a double image, and that gives high reflectance of projection light and high transmittance of visible light. Another object of the present invention is to provide a projection image display system that is not accompanied with a double image and is capable of displaying a clear image having high reflectance and high transmittance.

Solutions to the Problems

The preset inventor focused on the use of a cholesteric liquid crystal layer as a reflection layer, in order to solve the object. Namely, the inventor tried to prevent a double image by using p-polarized light as incident light and by suppressing reflected light from the surface of a member for projection image display, and then, to obtain a projection image utilizing selective reflection of the cholesteric liquid crystal layer. A rod-like liquid crystal compound generally used in making a cholesteric liquid crystal layer was used as a cholesteric liquid crystal compound. At this time, since the cholesteric liquid crystal layer reflects circularly polarized light, it was estimated that a clear projection image might be obtained by additionally using a λ/4 retardation layer that changes linearly p-polarized light to circularly polarized light. However, when the combination of a cholesteric liquid crystal layer and a λ/4 retardation layer was actually used, only a projection image with a light dose lower than the light dose estimated theoretically was obtained. Furthermore, large improvement was not obtained even when the orientation of a slow axis relative to incident p-polarized light was changed. Therefore, the present inventor has further made intensive studies on the configuration of a member for projection image display using a cholesteric liquid crystal layer as a reflection layer, and has completed the present invention.

Namely, the present invention provides [1] to [22] below.

[1] A member for projection image display, including a reflection layer and a retardation layer; wherein
the reflection layer includes a cholesteric liquid crystal layer exhibiting selective reflection in a visible light region, and
the cholesteric liquid crystal layer is a layer formed from a liquid crystal composition containing a discotic liquid crystal compound; and
a front phase difference of the retardation layer is in a range of 50 nm to 400 nm.

[2] The member for projection image display according to [1], wherein the reflection layer includes two or more cholesteric liquid crystal layers each exhibiting selective reflection in a visible light region, and includes a cholesteric liquid crystal layer formed from a liquid crystal composition containing a rod-like liquid crystal compound.

[3] The member for projection image display according to [1] or [2], wherein the reflection layer includes three layers or more cholesteric liquid crystal layers, and the three or more cholesteric liquid crystal layers exhibit central wavelengths of selective reflection that are different from one another.

[4] The member for projection image display according to [3], including a cholesteric liquid crystal layer having a central wavelength of selective reflection in 490 nm to 570 nm, a cholesteric liquid crystal layer having a central wavelength of selective reflection in 580 nm to 680 nm, and a cholesteric liquid crystal layer having a central wavelength of selective reflection in 700 nm to 830 nm.

[5] The member for projection image display according to [3] or [4], wherein helical senses of all cholesteric liquid crystal layers are the same.

[6] The member for projection image display according to any one of [1] to [5], wherein a total thickness of layers positioned on the retardation layer side relative to the reflection layer is 0.5 mm or more.

[7] The member for projection image display according to any one of [1] to [6], wherein the reflection layer, the retardation layer and a base material are laminated in this order.

[8] The member for projection image display according to [7], including a first base material, a second base material and an intermediate layer between the first base material and the second base material, wherein the reflection layer and the retardation layer are included in at least a part of the intermediate layer, and the first base material, the reflection layer, the retardation layer and the second base material are laminated in this order.

[9] The member for projection image display according to [8], wherein each of the first base material and the second base material is made of glass, and the member for projection image display is wind shield glass.

[10] The member for projection image display according to [8] or [9], wherein the intermediate layer includes a resin film.

[11] The member for projection image display according to [10], wherein the resin film contains polyvinyl butyral.

[12] The member for projection image display according to any one of [1] to [11], which is used as a combiner of a head-up display.

[13] A projection image display system which includes the member for projection image display according to any one of [1] to [12], wherein:
the retardation layer is disposed on an incident light side relative to the reflection layer; and
the incident light is p-polarized light that vibrates in a direction parallel to a plane of incidence.

[14] The projection image display system according to [13], wherein, when defining an emission direction of light on a line of intersection of the plane of incidence and the retardation layer as 0 degree, a slow axis direction of the retardation layer is in a range of +110° to +160°, or −110° to −160°, and a front phase difference of the retardation layer is 80 nm to 180 nm.

[15] The projection image display system according to [14], wherein helical senses of all cholesteric liquid crystal layers contained in the reflection layer are right-hand, and when defining an emission direction of light on a line of intersection of the plane of incidence and the retardation layer as 0 degree, a slow axis direction of the retardation layer is in a range of 110° to 160° clockwise when viewed from the retardation layer side relative to the reflection layer.

[16] The projection image display system according to [14], wherein helical senses of all cholesteric liquid crystal layers contained in the reflection layer are left-hand, and when defining an emission direction of light on a line of intersection of the plane of incidence and the retardation layer as 0 degree, a slow axis direction of the retardation layer is in a range of 110° to 160° counterclockwise when viewed from the retardation layer side relative to the reflection layer.

[17] The projection image display system according to [13], wherein, when defining an emission direction of light on a line of intersection of the plane of incidence and the retardation layer as 0 degree, a slow axis direction of the retardation layer is in a range of +20° to +70°, or −20° to −70°, and a front phase difference of the retardation layer is 250 nm to 400 nm.

[18] The projection image display system according to [17], wherein helical senses of all cholesteric liquid crystal layers contained in the reflection layer are right-hand, and when defining an emission direction of light on a line of intersection of the plane of incidence and the retardation layer as 0 degree, a slow axis direction of the retardation layer is in a range of 20° to 70° clockwise when viewed from the retardation layer side relative to the reflection layer.

[19] The projection image display system according to [17], wherein helical senses of all cholesteric liquid crystal layers contained in the reflection layer are left-hand, and when defining an emission direction of light on a line of intersection of the plane of incidence and the retardation layer as 0 degree, a slow axis direction of the retardation layer is in a range of 20° to 70° counterclockwise when viewed from the retardation layer side relative to the reflection layer.

[20] The projection image display system according to any one of [13] to [19], wherein the incident light enters the member at an angel of 45° to 70° relative to a normal line of the member for projection image display.

[21] The projection image display system according to any one of [13] to [20], wherein the incident light enters the member from a lower direction of the member for projection image display in use.

[22] The projection image display system according to any one of [13] to [21], which is a head-up display system.

Effect of the Invention

According to the present invention, a member for projection image display, which makes a head-up display system without a problem of a double image possible, exhibits high reflectance of projection light, namely, exhibits high brightness of a projection image, excellent tint balance and high transmittance of visible light, is provided. The present invention also provides a head-up display system that can display a clear image not exhibiting a double image and having high reflectance and high transmittance.

In the head-up display system of the present invention, a clear projection image can be observed even when being observed with a polarized sunglass.

MODES OF CARRYING OUT INVENTION

Figure 1:
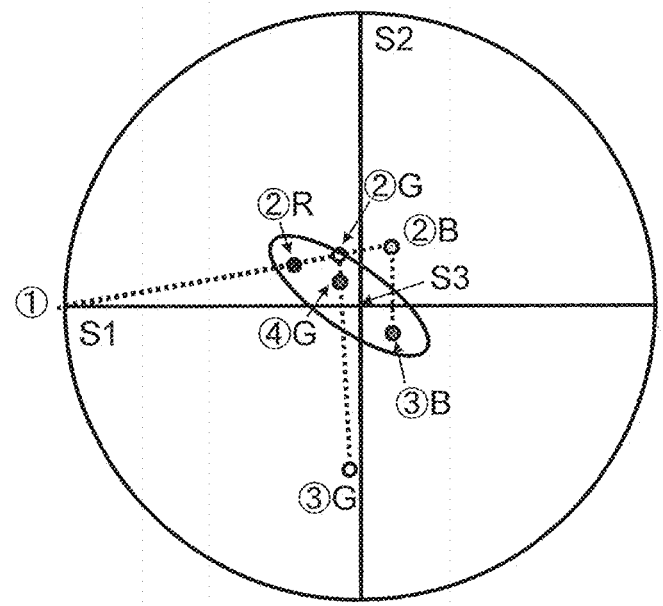
FIG. 1 is a diagram showing the change in a polarization state of incident light in a member for projection image display in Example 1, by using a Poincare sphere.

Hereinafter, the present invention will be explained in detail.

In the present specification, "to" is used in the meaning that numeric values described before and after "to" are included as the lower limit and the upper limit.

In the present specification, angles such as "90 degrees", or relations of angles such as "parallel", "horizontal", "vertical" each include ranges of error that would be acceptable in the technical field to which the present invention pertains. For example, the angle means to include a range that is 10 degrees larger than or less than a strict angle. The difference from a strict angle is preferably 5 degrees or less, more preferably 3 degrees or less.

In the present specification, when described as "selective" for circularly-polarized light, it means that the light dose of light of either a right circularly-polarized light component or a left circularly-polarized light component of light is larger than the other circularly-polarized light component. Specifically, when described as "selective," a degree of circularly-polarized light is preferably 0.3 or more preferably 0.6 or more, and further more preferably 0.8 or more. Substantial 1.0 is further preferable. Here, the degree of circularly-polarized light is a value represented by $|I_R-I_L|/(I_R+I_L)$, when denoting the intensity of a right circularly-polarized light component of light by $I_R$ and a left circularly-polarized light component of the light by $I_L$.

In the present specification, "sense" used regarding circularly-polarized light means whether the light is right circularly-polarized light or left circularly-polarized light. The sense of circularly polarized light is defined such that, when light is seen as it proceeds toward an observer, the case where the tip of the electric field vector rotates clockwise with the increase in time is right-circularly polarized light and the case where the tip rotates counterclockwise is left-circularly polarized light.

In the present specification, the term of "sense" may also be used regarding the helical twisting direction of a cholesteric liquid crystal. In the selective reflection by the cholesteric liquid crystal, when the helical twisting direction (sense) of the cholesteric liquid crystal is right-handed, right-circularly polarized light is reflected and left-circularly polarized light is transmitted, and when the sense is left-handed, left-circularly polarized light is reflected and right-circularly polarized light is transmitted.

In the present specification, "light" means a light which is visible light and also natural light (non-polarized light), unless otherwise described in particular. Visible light is light of wavelengths that is visible by eyes of human among electromagnetic waves, and generally indicates light in the wavelength region of 380 nm to 780 nm.

A measurement of light intensity, which is needed in connection with the calculation of light transmittance, may be conducted by using a normal visible light spectrometer with the air as reference.

In the present specification, when simply "reflected light" or "transmitted light" is referred to, it is used in a meaning of including scattered light and diffracted light.

The polarization state at respective wavelengths of light can be measured using a spectral radiance meter or a spectrometer mounted with a circular polarization plate. In this case, the intensity of light measured through a right-circular polarization plate corresponds to $I_R$, and the intensity of light measured through a left-circular polarization plate corresponds to $I_L$. Furthermore, a polarized state of a light source obtained by combining an ordinary light source such as an incandescent light bulb, a mercury lamp, a fluorescent lamp or an LED, which emit approximate natural light, and a measurement targent such as a filter can be obtained by measuring wavelength dependency of the circulary polarized light forming ability of the measurement targent using, for example, a polarized light retardation analysis apparatus "AxoScan" manufactured by Axometrics, Inc., and the like, and by multiplying it with wavelength dependency of emission intensity and polarized light forming ability of the ordinary light source which is separately measured by a spectrometer.

In addition, the properties can also be measured by attaching a circularly-polarizing plate to an illuminometer or a photo spectrometer. The quantity of right circularly-polarized light is measured by attaching a right circularly-polarizing plate, the quantity of left circularly-polarized light is measured by attaching a left circularly-polarizing plate, with the result that the ratio can be measured.

In the present specification, p-polarized light means a light that vibrates in a direction parallel to a plane of incidence. The plane of incidence means a layer that is vertical to a reflection surface such as a surface of a member for projection image display and includes an incident light beam and a reflected light beam. P-polarized light has a vibration plane of an electric vector that is parallel to the plane of incidence.

In the present specification, front phase difference is a value with unit of nm, which is measured by applying a light having a measurement wavelength in the normal direction of the film, using KOBRA-21ADH or WR (by Oji Scientific Instruments). The measurement wavelength is 550 nm. Upon the selection of the measurement wavelength, a wavelength selection filter can be applied manually, or the measurement value can be converted by using a program or the like. Front phase difference may be represented by Re In the present specification.

In the present specification, Rth indicates a phase difference along the thickness direction of a sample, and the measurement wavelength is 550 nm, and the unit of Rth is nm. When a film to be tested is represented by a uniaxial or biaxial refractive index ellipsoid, Rth of the film is calculated according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), Re of the film is measured at 6 points in all up to +50° relative to the normal direction of the film at intervals of 10°, by applying a light having a wavelength of 550 nm from the inclined direction of the film. KOBRA 21ADH or WR calculates Rth based on the above Re, an assumed value of the mean refractive index, and the input vale of the film thickness. When the film has a zero retardation value at a certain inclination angle with the in-plane slow axis from the normal direction taken as the rotation axis thereof, the symbol of the phase difference value of the film at an inclination angle larger than the above inclination angle is changed to a negative one, and then applied to KOBRA 21ADH or WR for calculation. With the slow axis taken as the inclination axis (rotation axis) (in case where the film has no slow axis, the rotation axis of the film may be in any in-plane direction of the film), the retardation values of the film are measured in any inclined two directions; and based on the data and an assumed value of the mean refractive index and the input film thickness, Rth may be calculated according to the following formulae (A) and (B).

$$\mathrm{Re}(\theta) = \left[ nx - \frac{(ny \times nz)}{\left( \sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2} \right)} \right] \times \frac{d}{\cos\left\{\sin^{-1}\left(\frac{\sin(-\theta)}{nx}\right)\right\}}$$ Formula (A)

Re(θ) means the retardation value of the film in the direction inclined by an angle θ from the normal direction. In formula (A), nx means the in-plane refractive index of the film in the slow axis direction; ny means the in-plane refractive index of the film in the direction vertical to nx; nz means the refractive index of the film vertical to nx and ny; and d is a thickness of the film.

$$Rth=((nx+ny)/2-nz)\times d$$ Formula (B)

When the film to be tested can not be represented by a uniaxial or biaxial index ellipsoid, or that is, when the film does not have an optical axis, then Rth of the film may be calculated according to the method mentioned below. With the in-plane slow axis (determined by KOBRA 21ADH or WR) taken as the inclination axis (rotation axis) of the film, Re of the film is measured at 11 points in all from −50° to +50° relative to the normal direction of the film at intervals of 10°, by applying a light having a wavelength of 550 nm from the inclined direction of the film. Based on the thus-determined retardation data of Re, an assumed value of the mean refractive index and the inputted film thickness, Rth of the film is calculated with KOBRA 21ADH or WR. For the assumed value of the mean refractive index, values described in catalogs for various types of optical films may be used. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59). The assumed value of the mean refractive index as above and the film thickness are input in KOBRA 21ADH or WR, nx, ny and nz are calculated therewith. From the thus-calculated data of nx, ny and nz, Nz=(nx−nz)/(nx−ny) is further calculated.

<Member for Projection Image Display>

In the present specification, a member for projection image display may be one that can display a projection image by reflected light, and may be one that can display visibly a projection image projected from a projector or the like. The member for projection image display may be a reflective member. Examples of the members for projection image display include a projection screen, a half mirror for projection image display, and the like. Examples of the half mirrors for displaying a projection image include a combiner for head-up display, a wind shield glass including a site having a combiner function for head-up display, and the like.

The member for projection image display of the present invention includes a reflection layer and a retardation layer. The member for projection image display may include an anti-reflection layer, an alignment layer, a support, an adhesion layer, a base material and the like, to be described below, in addition to the reflection layer and the retardation layer.

The member for projection image display may have a film-like shape, sheet-like shape, plate-like shape, or the like. The member for projection image display may be in a plane shape not having a curved surface, may have a curved face, or may be one having a concave or convex shape as a whole to thereby display a projection image while expanding or shrinking the image. In addition, the member may be one to be formed into the above-described shape by being combined with another member through adhesion, or the like, and before the combination, the member may be in a roll shape or the like as a thin film.

When a member for projection image display is a half mirror for projection image display, the member for projection image display may have a function as a mirror or a half mirrot for at least light being projected. For example, the member is not required to function as a half mirror for light in all visible light regions. Furthermore, the member for projection image display may have a function as a half mirror for light of all incident angles, or may have the above function for light of at least a part of incident angles.

The member for projection image display preferably has a visible light-transmitting property for making the observation of information or scenery on the opposite surface side possible. The member for projection image display may have light transmittance of 40% or more, preferably 50% or more, more preferably 60% or more, and further preferably 70% or more, in 80% or more, preferably 90% or more, more preferably 100% of the wavelength region of visible light. Light transmittance means a light beam transmittance calculated by the method described in JIS-K7105.

Optical properties of the member for projection image display for ultraviolet rays or infrared rays other than the visible light region are not particularly limited, and the member for projection image display may transmit, reflect or absorb ultraviolet rays or infrared rays. In order to shield heat for preventing deterioration of the member for projection image display, or in order to protect eyes of an observer, or the like, the member preferably has an ultraviolet ray reflecting layer or an infrared ray reflecting layer.

[Reflection Layer]

A reflection layer is a layer for reflecting light for displaying a projection image, and in the member for projection image display of the present invention, a reflection layer indicates a layer included as a layer distinguishable from the retardation layer. The reflection layer includes at least one layer of a cholesteric liquid crystal layer formed of a liquid crystal composition containing a discotic liquid crystal compound that exhibits selective reflection in a visible light region, and reflects light. The reflection layer may include two or more cholesteric liquid crystal layers, and may include other layers such as a support and an alignment layer.

(Cholesteric Liquid Crystal Layer)

In the present specification, the cholesteric liquid crystal layer means a layer obtained by fixing a cholesteric liquid crystal phase. The cholesteric liquid crystal layer may also be referred to as simply a liquid crystal layer.

The cholesteric liquid crystal phase is known to exhibit circularly polarized light selective reflection that reflects selectively circularly polarized light of a sense of either right circularly polarized light or left circularly polarized light, and that transmits circularly polarized light of the other sense. In the present specification, the circularly polarized light selective reflection may simply be referred to as selective reflection.

A large number of films formed from a composition containing a polymerizable liquid crystal compound are conventionally known as a film including a layer obtained by fixing a cholesteric liquid crystal phase exhibiting circularly polarized light selective reflection, and regarding the cholesteric liquid crystal layer, these conventional arts can be referred to.

The cholesteric liquid crystal layer may be a layer in which the alignment of liquid crystal compounds in a cholesteric liquid-crystalline phase is maintained, and typically, may be a layer obtained by forming a layer having no flow property by putting a polymerizable liquid crystal compound into an alignment state of a cholesteric liquid-crystalline phase and then polymerizing and curing the same by ultraviolet ray irradiation, heating or the like, and, at the same time, may be a layer obtained by changing the same into a state where the alignment form is not changed by an external field or an external force. Note that, in the cholesteric liquid crystal layer, it is sufficient that the optical properties of the cholesteric liquid-crystalline phase is maintained in the layer, and the liquid crystalline compound in the layer may not exhibit liquid crystallinity any more. For example, the polymerizable liquid crystal compound may have already lost liquid crystallinity by being made into a polymer through a curing reaction.

The central wavelength $\lambda$ of the selective reflection of cholesteric liquid crystal layer depends on a pitch P of the helical structure (=helical period) in the cholesteric phase, and follows a relation of $\lambda = n \times P$, n being an average refractive index of the cholesteric liquid crystal layer.

The central wavelength $\lambda$ and half-width of the selective reflection of cholesteric liquid crystal layer can be calculated as follows.

In a transmission spectrum of a cholesteric liquid crystal layer (measured from the normal direction of the cholesteric liquid crystal layer) obtained by using a spectrophotometer UV3150 (manufactured by Shimadzu Corporation), a downward peak at which the transmittance is reduced can be observed in the region of the selective reflection. When the wavelength vale of the shorter wavelength is defined as $\lambda 1$ (nm) and the wavelength vale of the longer wavelength is defined as $\lambda 2$ (nm) among two wavelengths at which the transmittance is a half the height of the maximum peak height, the central wavelength $\lambda$ and half-width $\Delta\lambda$ of the selective reflection can be represented by the following formulae:

central wavelength $\lambda = (\lambda 1 + \lambda 2)/2$ half-width $\Delta\lambda = (\lambda 2 - \lambda 1)$ The central wavelength $\lambda$ of the selective reflection obtained as above is approximately the same as the wavelength existing at center of gravity of a reflection peak of a circularly polarized light reflection spectrum measured from the normal direction of the cholesteric liquid crystal layer.

As is apparent from the above formula $\lambda = n \times P$, the central wavelength of selective reflection can be adjusted by adjusting the pitch of a helical structure. A cholesteric liquid crystal layer exhibiting selective reflection in the visible light region preferably has the central wavelength of selective reflection in the visible light region. The central wavelength $\lambda$ can be adjusted for, for example, selectively reflecting either right circularly polarized light or left circularly polarized light for red light, green light or blue light, by adjusting the n value and P value.

The head-up display system is preferably used so that the reflectance at the glass surface on the incident side of projection light becomes low, and light enters obliquely relative to the reflection layer. In this manner, when light obliquely enters the cholesteric liquid crystal layer, the central wavelength of selective reflection shifts to a shorter wavelength side. Therefore, $n \times P$ is preferably adjusted so that $\lambda$, calculated according to the formula $\lambda = n \times P$ becomes a wavelength longer than the wavelength of selective reflection required for the projection image display. When denoting, as $\lambda_d$, the central wavelength of selective reflection when light beam passes through a cholesteric liquid crystal layer of a refractive index $n_2$ with an angle of $\theta_2$ with respect to the normal direction of the cholesteric liquid crystal layer (the helical axis direction of the cholesteric liquid crystal layer), $\lambda_d$ is represented by a formula below.

$$\lambda_d = n_2 \times P \times \cos \theta_2$$

For example, light entering from the retardation layer side at an angle of 45° to 70° relative to the normal line of the member in the air having a refractive index of 1, usually, passes through the retardation layer having a refractive index of approximately 1.45 to 1.80 at an angle of 23° to 40° relative to the normal line of the member for projection image display and enters the cholesteric liquid crystal layer having a refractive index of approximately 1.61. In the cholesteric liquid crystal layer, the light transmits at an angle of 26° to 36°, and thus the angle and a central wavelength of a selective reflection to be obtained are inserted in the above formula and $n \times P$ may be adjusted.

The pitch of a cholesteric liquid-crystalline phase depends on the type or addition amount of a chiral agent to be used together with the polymerizable liquid crystal compound, and thus an intended pitch can be obtained by adjusting these. Note that, as a method for measuring a helical sense or helical pitch, methods described in "Easy Steps in Liquid Crystal Chemistry Experiment" p 46, edited by The Japanese Liquid Crystal Society, Sigma Publishing, published in 2007, or "Liquid Crystal Handbook" p 196, Editorial Committee of Liquid Crystal Handbook, Maruzen can be used.

A cholesteric liquid crystal layer whose helical sense is either right or left is used as each of cholesteric liquid crystal layers. Sense of reflected circularly polarized light by the cholesteric liquid crystal layer coincides with the helical sense.

As to the half-width $\Delta\lambda$ (nm) of a selective reflection zone that represents selective reflection, the $\Delta\lambda$ depends on birefringence $\Delta n$ and the pitch P of a liquid crystal compound, and follows the relation of $\Delta\lambda = \Delta n \times P$. Consequently, the control of the width of a selective reflection zone can be performed by adjusting the $\Delta n$. The adjustment of $\Delta n$ can be performed by adjusting the type or mixing ratio of a polymerizable liquid crystal compound, or by controlling the temperature in fixing the alignment.

In order to form one type of cholesteric liquid crystal layer having the same central wavelength of selective reflection, a plurality of cholesteric liquid crystal layers having the same pitch P and the same helical sense may be laminated. Circularly polarized light selectivity can be enhanced at a specific wavelength by laminating cholesteric liquid crystal layers having the same pitch P and the same helical sense.

The width of the selective reflection zone is, usually, in the case of one type of a material, approximately 15 nm to 100 nm, for example, in the visible light region. In order to widen the width of the selective reflection zone, two or more types of cholesteric liquid crystal layers having varied pitches P and having different central wavelengths of reflected light from each other, may be laminated. At this time, lamination of cholesteric liquid crystal layers having the same helical sense is preferable. Furthermore, the width of the selective reflection zone can also be widened by gradually varying the pitch P in the thickness direction in one cholesteric liquid crystal layer. The width of the selective reflection zone is not particularly limited, and may be a wavelength width of 1 nm, 10 nm, 50 nm, 100 nm, 150 nm, 200 nm, or the like. The width is preferably approximately 100 nm or less.

The reflection layer also preferably has an apparent central wavelength of selective reflection for red light, green light and blue light. The apparent central wavelength of selective reflection means a wavelength existing at center of gravity of the reflection peak of circularly polarized light reflection spectrum of a cholesteric liquid crystal layer, which is measured from the observation direction in practical use. This is because display of a full color projection image becomes possible. The property can be achieved by a configuration including three kinds or more of cholesteric liquid crystal layers as the reflection layer. Specifically, the configuration may be such that three kinds of cholesteric liquid crystal layers having different pitches P, that is, having different central wavelengths of selective reflection. Specifically, the reflection layer preferably includes a cholesteric liquid crystal layer selectively reflecting red light, a cholesteric liquid crystal layer selectively reflecting green light and a cholesteric liquid crystal layer selectively reflecting blue light. The reflection layer preferably includes, for example, a cholesteric liquid crystal layer having the central wavelength of selective reflection in 490 nm to 570 nm, a cholesteric liquid crystal layer having the central wavelength of selective reflection in 580 nm to 680 nm, and a cholesteric liquid crystal layer having the central wavelength of selective reflection in 700 nm to 830 nm. Note that the central wavelength of selective reflection shown here is a central wavelength when being measured from a normal direction of the cholesteric liquid crystal layer. At this time, the order of laminating the cholesteric liquid crystal layer having the central wavelength of selective reflection in 490 nm to 570 nm, the cholesteric liquid crystal layer having the central wavelength of selective reflection in 580 nm to 680 nm, and the cholesteric liquid crystal layer having the central wavelength of selective reflection in 700 nm to 830 nm is not particularly limited.

A clear projection image can be displayed with good utilization efficiency of light by adjusting the central wavelength of selective reflection of a cholesteric liquid crystal layer to be used in accordance with an emission wavelength region of a light source to be used in projection and a use mode of a reflection layer. In particular, a clear color projection image can be displayed with good utilization efficiency of light by separately adjusting each of the central wavelengths of selective reflection of a plurality of cholesteric liquid crystal layers in accordance with emission wavelength region or the like of light sources to be used for projection. Use modes of the reflection layer include, in particular, an incident angle of projection light to the reflection layer, an observation direction of a projection image on the surface of the reflection layer, and the like.

All of helical senses of the cholesteric liquid crystal layers having different central wavelengths of selective reflection may be the same, or some of these contained may be different, and preferably all helical senses of cholesteric liquid crystal layers are the same.

When laminating a plurality of cholesteric liquid crystal layers, cholesteric liquid crystal layers separately produced may be laminated using an adhesive agent or the like, or processes of alignment and fixing may be repeated by direct application of a liquid crystal composition containing a polymerizable liquid crystal compound and the like to the surface of a former cholesteric liquid crystal layer formed in advance by a method to be described below, and the latter is preferable. This is because, by directly forming a subsequent cholesteric liquid crystal layer on the surface of a cholesteric liquid crystal layer formed in advance, alignment orientation of liquid crystal molecules on the lower side in the cholesteric liquid crystal layer to be formed thereon coincides with the alignment orientation of liquid crystal molecules on the air interface side of the cholesteric liquid crystal layer formed in advance, and thus polarization properties of the laminate of cholesteric liquid crystal layers become excellent. Furthermore, when an adhesion layert that usually is provided at a thickness of 0.5 to 10 μm is used, interference unevenness derived from thickness unevenness of the adhesion layer may be observed, and thus lamination without the use of an adhesion layer is preferable.

(Production Method of Layer Obtained by Fixing Cholesteric Liquid Crystal Phase)

Hereinafter, materials for producing and methods for producing the cholesteric liquid crystal layer will be explained.

Examples of the materials to be used in forming the cholesteric liquid crystal layer include a liquid crystal composition or the like containing a polymerizable liquid crystal compound and a chiral agent (an optically active compound). The liquid crystal composition obtained by dissolving additionally, as necessary, a surfactant, a polymerization initiator or the like in a solvent or the like is applied to a support, an alignment film, a cholesteric liquid crystal layer serving as a lower layer, or the like, which is fixed by curing the liquid crystal composition after cholesteric alignment and maturing, with the result that the cholesteric liquid crystal layer can be formed.

(Polymerizable Liquid Crystal Compound)

The member for projection image display of the present invention includes, in the reflection layer, a cholesteric liquid crystal layer formed from a liquid crystal composition containing a discotic liquid crystal compound (which may be referred to as "DLC" in the present specification). The present inventors found that a clear projection image was able to be obtained with high light dose by using the cholesteric liquid crystal layer formed from a liquid crystal composition containing a discotic liquid crystal compound, when displaying an image while using p-polarized light as incident light, on the member for projection image display using the cholesteric liquid crystal layer as the reflection layer. In addition, the inventors further found that the combined use of DLC having negative Rth and CLC having positive Rth cancels birefringence of a cholesteric liquid crystal, thereby making it easy to keep tint balance and to carry out adjustment of Re and axis-direction of the retardation layer.

As the discotic liquid crystal compound, for example, those described in Japanese Patent Laid-Open Nos. 2007-108732 or 2010-244038 can preferably be used.

Hereinafter, preferable examples of the discotic liquid crystal compounds will be shown, but the present invention is not limited to these examples.

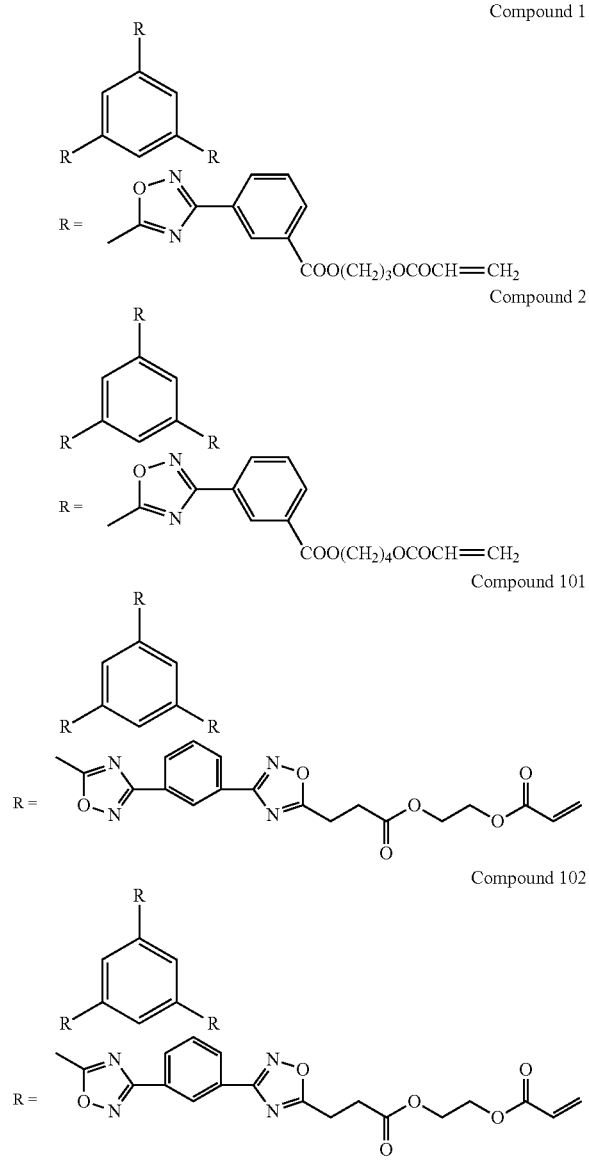

The reflection layer in the member for projection image display of the present invention may include, together with the cholesteric liquid crystal layer formed from a liquid crystal composition containing a discotic liquid crystal compound, a cholesteric liquid crystal layer formed from a liquid crystal composition containing a rod-like liquid crystal compound (which may be referred to as "CLC" in the present specification).

The reflection layer of the member for projection image display of the present invention may include two or more cholesteric liquid crystal layers. As described above, in order to make display of a full color projection image possible, a configuration of including three types or more of cholesteric liquid crystal layers as the reflection layer is also preferable. When the reflection layer includes two or more cholesteric liquid crystal layers, the selection of DLC and CLC of respective layers is not particularly limited, and all of these may be DLC, or DLC and CLC may be combined. For example, in the case of a reflection layer including three cholesteric liquid crystal layers, the layers may be a combination of two DLCs and one CLC, or may be a combination of one DLC and two CLCs. Further, when a combination of DLC and CLC is to be used, either DLC or CLC may be positioned on the retardation layer side. When forming a reflection layer including two or more cholesteric liquid crystal layers exhibiting central wavelengths of selective reflection that are different from each other, DLC may be used in any of wavelength regions.

Examples of rod-like polymerizable liquid crystal compounds for forming a cholesteric liquid-crystalline layer include a rod-like nematic liquid crystal compound. As the rod-like nematic liquid crystal compound, azomethines, azoxys, cyanobiphenyls, cyanophenyl esters, benzoic esters, cyclohexane carboxylic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles are preferably used.

The polymerizable liquid crystal compound can be obtained by introducing a polymerizable group into a liquid crystal compound. Examples of the polymerizable groups include an unsaturated polymerizable group, an epoxy group and an aziridinyl group, and an unsaturated polymerizable group is preferable, and an ethylenically unsaturated polymerizable group is particularly preferable. The polymerizable group can be introduced into the molecule of a liquid crystal compound by various methods. The number of polymerizable groups of a polymerizable liquid crystal compound is preferably 1 to 6, more preferably 1 to 3. Examples of the polymerizable liquid crystal compounds include compounds described in Makromol. Chem., vol. 190, p 2255 (1989), Advanced Materials vol. 5, p 107 (1993), U.S. Pat. Nos. 4,683,327, 5,622,648 and 5,770,107, International Publication Nos. WO 95/22586, 95/24455, 97/00600, 98/23580 and 98/52905, Japanese Patent Laid-Open Publication Nos. 01-272551, 06-16616, 07-110469, 11-80081 and 2001-328973. Two or more types of polymerizable liquid crystal compounds may be simultaneously used. The simultaneous use of two or more types of polymerizable liquid crystal compounds can lower the alignment temperature.

Not only low-molecular-weight liquid crystal compounds, but also high-molecular-weight liquid crystal compounds can be used.

Furthermore, the addition amount of the polymerizable liquid crystal compound in the liquid crystal composition is preferably 80 to 99.9% by mass relative to the solid mass (the mass obtained by removing a solvent) of the liquid crystal composition, more preferably 85 to 99.5% by mass, and particularly preferably 90 to 99% by mass.

(Chiral Agent: Optically Active Compound)

The chiral agent has a function of inducing the helical structure of the cholesteric liquid-crystalline phase. Since chiral compounds have different helical senses or helical pitches to be induced depending on compounds, the selection may be carried out in accordance with the purpose.

No particular limitation is imposed on the chiral agent, and known compounds (for example, those described in Liquid Crystal Device Handbook, Chapter 3, Section 4-3, Chiral agent for TN and STN, p 199, edited by Japan Society for the Promotion of Science, 142nd Committee, 1989), isosorbide and isomannide derivatives can be used.

The chiral agent generally contains an asymmetric carbon atom, but an axially asymmetric compound or a planarly asymmetric compound which does not contain an asymmetric carbon atom can also be used as the chiral agent. Examples of the axially asymmetric compounds or planarly asymmetric compounds include binaphthyl, helicene, paracyclophane, and derivatives thereof. The chiral agent may have a polymerizable group. When both the chiral agent and the liquid crystal compound have a polymerizable group, a polymer having a repeating unit induced from the polymerizable liquid crystal compound and a repeating unit induced from the chiral agent can be formed by a polymerization reaction between the polymerizable chiral agent and the polymerizable liquid crystal compound. In this aspect, the polymerizable group of the polymerizable chiral agent is preferably the same type of group as the polymerizable group of the polymerizable liquid crystal compound. Accordingly, the polymerizable group of the chiral agent is also preferably an unsaturated polymerizable group, an epoxy group or an aziridinyl group, more preferably an unsaturated polymerizable group, and particularly preferably an ethylenically unsaturated polymerizable group.

In addition, the chiral agent may be a liquid crystal compound.

The content of the chiral agent in the liquid crystal composition is preferably 0.01% by mole to 200% by mole of the amount of the polymerizable liquid crystalline compound, more preferably 1% by mole to 30% by mole.

(Polymerization Initiator)

The liquid crystal composition preferably contains a polymerization initiator. In an aspect of proceeding with a polymerization reaction by ultraviolet ray irradiation, the polymerization initiator to be used is preferably a photo polymerization initiator that can initiate a polymerization reaction by the ultraviolet ray irradiation. Examples of the photo polymerization initiators include α-carbonyl compounds (described in U.S. Pat. No. 2,367,661 or U.S. Pat. No. 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. No. 3,046,127 or U.S. Pat. No. 2,951,758), a combination of triarylimidazol dimer and p-aminophenyl ketone (described in U.S. Pat. No. 3,549,367), acridine and phenazine compounds (described in Japanese Patent Laid-Open Publication Nos. 60-105667 or U.S. Pat. No. 4,239,850), oxadiazole compounds (described in U.S. Pat. No. 4,212,970), and the like.

The content of the photo polymerization initiator in the liquid crystal composition is preferably 0.1% by mass to 20% by mass, more preferably 0.5% by mass to 5% by mass, relative to the content of the polymerizable liquid crystal compound.

(Cross-Linking Agent)

The liquid crystal composition may arbitrarily contain a cross-linking agent for enhancing film strength and durability after curing. As the cross-linking agent, those that are curable by ultraviolet rays, heat, moisture or the like can suitably be used.

The cross-linking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret type isocyanate; polyoxazoline compounds having an oxazoline group on a side chain; alkoxysilane compounds such as vinyltrimethoxysilane and N-(2-aminoethyl)3-aminopropyltrimethoxysilane; and the like. Furthermore, a known catalyst can be used in accordance with the reactivity of the cross-linking agent, and thus productivity can be enhanced in addition to the enhancement of film strength and durability. These may be used in one type alone or in combination of two or more types thereof.

The content of the cross-linking agent is preferably 3% by mass to 20% by mass, more preferably 5% by mass to 15% by mass. When the content of the cross-linking agent is less than 3% by mass, the effect of enhancing cross-link density may not be obtained, and when the content exceeds 20% by mass, the stability of the cholesteric liquid-crystalline layer may be deteriorated.

(Alignment Control Agent)

An alignment control agent that contributes to achieving stably or quickly a cholesteric liquid-crystalline layer of planar alignment may be added to the liquid crystal composition, Examples of the alignment control agents include fluorine-containing (meth)acrylate-based polymers described in Japanese Patent Laid-Open Publication No. 2007-272185, paragraphs [0018]-[0043] or the like, and compounds represented by formulae (I)-(IV) described in Japanese Patent Laid-Open Publication No. 2012-203237, paragraphs [0031]-[0034] or the like.

Note that, as the alignment control agent, one type may be used alone, or two or more types thereof may be simultaneously used.

The addition amount of the alignment control agent in the liquid crystal composition is preferably 0.01% by mass to 10% by mass, more preferably 0.01% by mass to 5% by mass, and particularly preferably 0.02% by mass to 1% by mass, relative to the total mass of the polymerizable liquid crystal compound.

(Other Additives)

In addition, the liquid crystal composition may contain at least one type selected from various additives such as a surfactant for adjusting the surface tension and making the thickness of the applied film uniform, a polymerizable monomer, etc. Furthermore, a polymerization inhibitor, an oxidation inhibitor, an ultraviolet ray absorber, a light stabilizer, a colorant, a metal oxide fine particle or the like may be added, as necessary, to the liquid crystal composition in a range not lowering the optical properties.

The cholesteric liquid-crystalline layer in which the cholesteric regularity is fixed can be formed by applying, onto a support, an alignment layer, or a cholesteric liquid crystal layer formed in advance, a liquid crystal composition obtained by dissolving the polymerizable liquid crystal compound and the polymerization initiator, and a chiral agent, surfactant or the like, which are added as necessary, by drying the same to thereby give a coating film, and by irradiating the coating film with actinic rays to thereby cure the cholesteric liquid crystalline composition. Note that a stacked film including a plurality of cholesteric liquid-crystalline layers can be formed by repeating the manufacture processes of the cholesteric liquid-crystalline layer.

(Solvent)

The solvent used for preparing the liquid crystal composition is not particularly limited and can be appropriately selected in accordance with the purpose, and an organic solvent is used preferably.

The organic solvent is not particularly limited and can be selected in accordance with the purpose. Examples of the organic solvent include ketones, alkyl halides, amides, sulfoxides, heterocyclic compounds, hydrocarbons, esters, ethers, and the like. These may be used in one type alone, or in combination of two or more types thereof. Among these, ketones are particularly preferred in consideration of environmental loads.

(Application, Alignment, Polymerization)

The method for applying the liquid crystal composition onto a base material is not particularly limited and can be appropriately selected in accordance with the purpose. Examples of the methods include a wire bar coating method, a curtain coating method, an extrusion coating method, a direct gravure coating method, a reverse gravure coating method, a die coating method, a spin coating method, a dip coating method, a spray coating method, a slide coating method, and the like. The application can also be performed by transferring a liquid crystal composition separately applied onto a support. Liquid crystal molecules are aligned by heating the applied liquid crystal composition. The heating temperature is preferably 200° C. or less, more preferably 130° C. or less. An optical thin film, in which polymerizable liquid crystal compounds are in a twisted alignment state so as to have a helix axis in a direction substantially perpendicular to the film surface, can be obtained by the alignment treatment.

The aligned liquid crystal compound may be further polymerized to cure the liquid crystal composition. The polymerization may be either thermal polymerization or photo polymerization by light irradiation, but photo polymerization is preferable. Ultraviolet rays are preferably used for light irradiation. Irradiation energy is preferably 20 mJ/cm$^2$ to 50 J/cm$^2$, more preferably 100 mJ/cm$^2$ to 1,500 mJ/cm$^2$. In order to accelerate the photo polymerization reaction, the light irradiation may be performed under heating conditions or under a nitrogen atmosphere. The wavelength of irradiated ultraviolet ray is preferably 350 nm to 430 nm. As to a polymerization reaction ratio, the higher one is preferable from the viewpoint of stability, 70% or more is preferable, and 80% or more is more preferable.

The polymerization reaction ratio can be determined by measuring the consumed ratio of polymerizable functional groups through the use of an IR absorption spectrum.

[Retardation Layer]

The retardation layer is not particularly limited and can suitably be selected in accordance with a purpose, and examples thereof include a stretched polycarbonate film, a stretched norbornene-based polymer film, a transparent film obtained by incorporating and aligning inorganic particles having birefringence such as strontium carbonate, a film obtained by uniaxially aligning and alignment-fixing a liquid crystal compound, a thin film obtained by obliquely vapor-depositing an inorganic dielectric substance on a support, and the like.

The thickness of the retardation layer is preferably 0.2 µm to 300 µm more preferably 0.5 µm to 150 µm, and further preferably 1 µm to 80 µm.

Front phase difference of the retardation layer may be 50 nm or more, and may be preferably selected in a range of 50 to 400 nm. For example, corresponding to a slow axis direction, the front phase difference is preferably 80 nm to 180 nm or 250 nm to 400 nm, or may be 90 nm to 170 nm or 250 nm to 350 nm, or 110 nm to 150 nm or 280 nm to 330 nm, or the like. The slow axis direction of the retardation layer is preferably determined according to the front phase difference, the helical sense of the cholesteric liquid crystal layer, and incident direction of incident light for projection image display in use as the projection image display system.

[Other Layers]

The member for projection image display of the present invention may include layers other than the cholesteric liquid crystal layer and the retardation layer. Each of the other layers is preferably transparent in the visible light region. In the present specification, "transparent in the visible light region" means that transmittance of visible light is 70% or more.

Furthermore, each of other layers preferably has low birefringence. In the present specification, low birefringence means that the front phase difference is 10 nm or less in the wavelength region in which the member for projection image display of the present invention exhibits reflection, and the front phase difference is preferably 5 nm or less. Moreover, each of other layers preferably has a refractive index that exhibits small difference from an average refractive index (in-plane average refractive index) of the cholesteric liquid crystal layer. Examples of other layers include a support, an alignment layer, an adhesion layer, a base material, and the like.

(Support)

The member for projection image display may include a support serving as a substrate in forming the cholesteric liquid crystal layer or the retardation layer.

The support is not particularly limited. The support to be used for forming the cholesteric liquid crystal layer or the retardation layer may be a temporary support that is peeled off after forming the cholesteric liquid crystal layer and may not be included in the member for projection image display. Examples of the supports include films of plastics such as: polyester such as polyethylene terephthalate (PET), polycarbonate, acrylic resin, epoxy resin, polyurethane, polyamide, polyolefin, cellulose derivatives and silicone. In addition to the plastic films, glass may be used as the temporary support.

The thickness of the support may be approximately 5 µm to 1000 µm, and is preferably 10 µm to 250 µm, and more preferably 15 µm to 90 µm.

(Alignment Layer)

The member for projection image display may include an alignment layer as a lower layer to which a liquid crystal composition is applied in forming the cholesteric liquid crystal layer or the retardation layer.

The alignment layer can be provided by a procedure such as: a rubbing treatment of an organic compound such as a polymer (a resin such as polyimide, polyvinyl alcohol, polyester, polyarylate, polyamide-imide, polyether-imide, polyamide, or modified polyamide); oblique vapor-deposition of an inorganic compound; formation of a layer having a microgroove; or accumulation of an organic compound (such as co-tricosanoic acid, dioctadecylmethylammonium chloride and methyl stearylate) by a Langmuir-Blodgett method (LB film). Furthermore, an alignment layer that generates an orientation function by application of an electric field, application of a magnetic field or light irradiation may also be used.

Particularly preferably, the alignment layer consisting of polymer is subjected to a rubbing treatment and then a liquid crystal composition is applied to the surface subjected to the rubbing treatment. The rubbing treatment can be performed by rubbing the surface of the polymer layer in a constant direction, with paper or cloth.

A liquid crystal composition may be applied to a support surface without providing an alignment layer, or to a surface obtained by subjecting a support to a rubbing treatment.

When forming the liquid crystal layer by using a temporary support, the alignment film may not to be a layer constituting the member for projection image display by being peeled off together with the temporary support.

The thickness of the alignment layer is preferably 0.01 to 5 μm, further preferably 0.05 to 2 μm.

(Adhesion Layer)

The member for projection image display may include an adhesion layer for adhesion of respective layers. The adhesion layer may be provided, for example, between cholesteric liquid crystal layers, between the reflection layer and the retardation layer, between the cholesteric liquid crystal layer and the support, between the reflection layer and an intermediate film sheet, between the retardation layer and the intermediate film sheet, and the like.

The adhesion layer may be a layer formed of an adhesive agent.

From the viewpoint of a curing system, as the adhesive agent, there are adhesives of a hot melt type, a thermosetting type, a photo curable type, a reaction curable type and a pressure-sensitive adhesion type that does not require curing, and each of the types can use acrylate-based, urethane-based, urethane-acrylate-based, epoxy-based, epoxy-acrylate-based, polyolefin-based, modified olefin-based, polypropylene-based, ethylene-vinyl alcohol-based, vinyl chloride-based, chloroprene rubber-based, cyano acrylate-based, polyamide-based, polyimide-based, polystyrene-based or polyvinyl butyral-based compound. From the viewpoint of workability and productivity, the photo curing type is preferable as the curing system, and from the viewpoint of optical transparency and heat resistance, the use of an acrylate-based, an urethane-acrylate-based, an epoxy-acrylate-based raw material or the like is preferable.

The thickness of the adhesion layer may be 0.5 to 10 μm, preferably 1 to 5 μm. In order to reduce color unevenness or the like of the member for projection image display, the adhesion layer is preferably provided at a uniform thickness.

(Base Material)

The member for projection image display may include a base material. The base material may be the same as the support used in forming the cholesteric liquid crystal layer, or may be a material that is provided independently from the support.

Another article such as a front glass of a vehicle may function as the base material. Furthermore, when the member for projection image display is a wind shield glass, a glass plate to be used in forming the wind shield glass may function as the base material. The base material may be positioned, when viewed from the reflection layer, on the retardation layer side, on the opposite side, or on both sides, and the base material is preferably positioned at least on the retardation layer side. Namely, the member for projection image display of the present invention preferably has a configuration including the reflection layer, the retardation layer, and the base material in this order.

The same materials described as examples of the support can be used as the base material. Furthermore, the thickness of the base material may be the same as that of the support, and may be larger than 1000 μm, or 10 mm or more. Moreover, the thickness may be 200 mm or less, 100 mm or less, 80 mm or less, 60 mm or less, 50 mm or less, 40 mm or less, 30 mm or less, 20 mm or less, or the like.

In the member for projection image display of the present invention, the cholesteric liquid crystal layer may be provided on only one surface of the base material, and preferably the cholesteric liquid crystal layer is not provided on the other surface.

There may be a case where a double image is observed in visual observation of a projection image on the surface on which the cholesteric liquid crystal layer is provided by interfacial reflection: on the surface of the base material opposite to the surface on which the cholesteric liquid crystal layer is provided; or on the air side surface of another layer provided on the aforementioned surface on the opposite side. In order to prevent such a phenomenon, an anti-reflection layer may be provided on the surface on the opposite side of the base material.

The base material preferably is transparent and has low birefringence in the visible light region.

Examples of base materials being transparent and having low birefringence in the visible light region include inorganic glass, polymer resin and the like. As the polymer resin having low birefringence, low birefringent organic raw materials to be used in an optical disk substrate in which birefringence causes a failure of image formation or signal noise, a pickup lens, lenses for a camera, a microscope or a video camera, a substrate for a liquid crystal display, a prism, optical interconnection parts, an optical fiber, a light guiding plate for a liquid crystal display, lenses for a laser beam printer, and a projector or a facsimile, a Fresnel lens, a contact lens, a protective film for a polarization plate, a micro lens array, and the like can be used in the same manner.

Specific examples of polymer resin raw materials that can be used for the purpose include acrylic resin (acrylic esters such as polymethyl(meth)acrylate, and the like); polycarbonate; cyclic polyolefin such as cyclopentadiene-based polyolefins and norbornene-based polyolefins; polyolefins such as polypropylene; aromatic vinyl polymers such as polystyrene; polyarylate; and cellulose acylate.

[Layers Positioned on Visual Recognition Side with Respect to Reflection Layer]

Generally, in the member for projection image display, the problem of a double image (or a multiplex image) is generated by the overlap of an image caused by reflected light from a layer that reflects projection light, and an image caused by reflected light from the front surface viewed from light incident side of the member for projection image display or from the rear side surface. In the member for projection image display of the present invention, light having passed through the cholesteric liquid crystal layer in the reflection layer has become circularly polarized light having the inverse sense as compared with circularly polarized light reflected by the cholesteric liquid crystal layer, and when a layer positioned on a side closer to the rear surface side than the reflection layer exhibits low birefringence, reflected light from the rear side surface is usually mainly a circularly polarized light that is reflected by the cholesteric liquid crystal layer, and thus a remarkable double image is difficult to be generated. In particular, a configuration can be set such that most of projection light is reflected by the reflection layer by utilizing polarized light as the projection light. On the other hand, reflected light form the front surface can generate a remarkable double image. Particularly, a double image can be remarkable when the distance from the center of gravity of the cholesteric liquid crystal layer to the front surface, as viewed from a light incident side of the member for projection image display, is a certain value or more. Specifically, in the structure of the member for projection image display of the present invention, when the total sum of thicknesses of layers positioned on a side closer to the retardation layer side than the reflection layer (the sum not including the thickness of the reflection layer, but including the thickness of the retardation layer), namely, the distance from the outermost surface of the reflection layer on the retardation layer side to the outermost surface of the member for projection image display on the retardation layer side relative to the reflection layer becomes 0.5 mm or more, a double image can be remarkable, can be more remarkable when the distance is 1 mm or more, can be further more remarkable when the distance is 1.5 mm or more, and can be particularly remarkable when the distance is 2.0 mm or more. Examples of layers positioned on the visual recognition side include a support, an intermediate film sheet and base materials such as a second glass plate, and the like, in addition to the retardation layer.

However, in the member for projection image display of the present invention in projection image display utilizing p-polarized light, as described below, even when the total sum of thicknesses of layers positioned on a side closer to the visual recognition side than the reflection layer is as that described above, a projection image can be visually recognized without a remarkable double image.

[Combiner]

The member for projection image display of the present invention can be used as a combiner in a head-up display system. In the head-up display system, the combiner means an optical member that can display an image projected from a projector so as to be able to be visually recognized, and that makes it possible, when observing the combiner from the side same as the surface side on which an image is displayed, to observe, at the same time, information or a scenery positioned on the opposite surface side. Namely, the combiner has a function as a light path combiner that displays external light and image light in a superposed state. From another viewpoint, the combiner has a function of a half mirror that displays an image formed of reflected light and an image formed of transmitted light in a superposed state.

[Wind Shield Glass]

The member for projection image display of the present invention may be a wind shield glass. In other words, a configuration may be such that at least a part of a wind shield glass can display a projection image. At least a part of a wind shield glass may have a function as the above-mentioned combiner. In the present specification, the wind shield glass means a window glass of a vehicle such as a train or a car, and a general means of transport such as an airplane, a ship and play equipment. The wind shield glass is preferably a front glass positioned in the direction of movement of the means of transport. The wind shield glass is preferably a front glass of a vehicle.

The wind shield glass may have a flat plane-like shape. The wind shield glass may be molded for being mounted on a means of transport to be applied, and for example, may have a curved surface. In the wind shield glass molded for a means of transport to be applied, usually, a direction to be upside (vertical upside) and a surface on the observer side in normal use can be specified. The wind shield glass may be configured so as to be in the order of the retardation layer and the reflection layer from the observer side in use in a means of transport (usually the inside of the means of transport).

The reflection layer and the retardation layer may be made into a reflection film (a half mirror film) including these to be provided on the outside of the glass plate of the wind shield glass or may be provided in the intermediate layer of a wind shield glass that has a configuration of a laminated glass as described below. When the reflection film is provided on the outside of the glass plate of the wind shield glass, the reflection film may be provided on the observer side with respect to the glass plate or the opposite side. It is preferable that the reflection film is provided on the observer side. It is particularly preferable that the reflection film is provided in the intermediate layer of a wind shield glass.

The reflection layer and the retardation layer may be made into a reflection film by being formed separately from each other and by adhering to each other, or the retardation layer may be formed on the reflection layer (cholesteric liquid crystal layer), or the reflection layer (cholesteric liquid crystal layer) may be formed on the retardation layer.

The reflection film may include, in addition to the reflection layer and the retardation layer, layers such as an alignment layer, a support and an adhesion layer.

(Laminated Glass)

The wind shield glass has preferably a configuration of a laminated glass. That is, the wind shield glass has preferably a structure in which two glass plates attach to each other via an intermediate layer. In the present specification, in the wind shield glass, a glass plate positioned farther from an observer side may be referred to as a first glass plate (first base material), and a glass plate positioned closer to an observer side may be referred to as a second glass plate (second base material).

A glass plate generally used for a wind shield glass can be utilized as the glass plate. The thickness of the glass plate is not particularly limited and may be approximately 0.5 mm to 5 mm, preferably 1 mm to 3 mm, and more preferably 2.0 to 2.3 mm.

The wind shield glass that has a configuration of a laminated glass can be manufactured using a known production method of laminated glass. Generally, the glass can be manufactured by a method of, after sandwiching an intermediate film sheet for laminated glass between two glass plates, repeating a heat treatment and a pressurizing treatment (such as a treatment with rubber rollers) several times, and finally, performing a heat treatment under a pressurized condition while utilizing an autoclave or the like.

The wind shield glass of a configuration of laminated glass, having the reflection film including the reflection layer and the retardation layer in an intermediate film, may be formed through a usual production process of laminated glass after forming the reflection film on the surface of a glass plate, or may be formed by performing the above-described heat treatment and pressurizing treatment while using a laminated intermediate film sheet for laminated glass including the reflection film as an intermediate film sheet. When forming the reflection film on the surface of a glass plate, the glass plate on which the reflection film is to be formed may be the first glass plate or the second glass plate. At this time, for example, the reflection film may be stuck to the glass plate with an adhesive.

(Intermediate Film Sheet)

Any of known intermediate film sheets may be used as the intermediate film sheet when an intermediate film sheet not including the reflection film is to be used. For example, a resin film containing a resin selected from the group of polyvinyl butyral (PVB), ethylene-vinyl acetate copolymers and chlorine-containing resins can be used. The resin is preferably a main component of the intermediate film sheet. Note that the main component means a component that occupies a ratio of 50% by mass or more of the intermediate film sheet.

Among the resins, polyvinyl butyral or an ethylene-vinyl acetate copolymer is preferable, and polyvinyl butyral is more preferable. The resin is preferably a synthetic resin.

Polyvinyl butyral can be obtained by acetalizing polyvinyl alcohol with butyl aldehyde. A preferable lower limit of the degree of acetalization of the polyvinyl butyral is 40% and a preferable upper limit thereof is 85%, and a more preferable lower limit is 60% and a more preferable upper limit is 75%.

Polyvinyl alcohol is obtained, usually, by saponifying polyvinyl acetate, and polyvinyl alcohol having a saponification degree of 80 to 99.8% by mol is generally used.

Furthermore, a preferable lower limit of the polymerization degree of the polyvinyl alcohol is 200, and a preferable upper limit is 3000. When the polymerization degree is 200 or more, penetration resistance of a laminated glass to be obtained can not be easily lowered, and when the polymerization degree is 3000 or less, moldability of a resin film is sufficient, and rigidity of the resin film cannot become too large and a sufficient productivity can be maintained. A more preferable lower limit is 500, and more preferable upper limit is 2000.

(Intermediate Film Sheet Including Reflection Layer and Retardation Layer)

The laminated intermediate film sheet for laminated glass including the reflection layer and the retardation layer can be formed by sticking the reflection film on the surface of the intermediate film sheet. Alternatively, the sheet can also be formed by sandwiching the reflection film between two of the intermediate film sheets. The two intermediate film sheets may be the same or different ones, and the same one is preferable.

A known sticking method can be used for sticking the reflection film and the intermediate film sheet, and the use of a laminate processing is preferable. When the laminate processing is performed so that the laminate and the intermediate film sheet are not peeled off after processing, the laminate processing is preferably performed under a certain level of heating and pressurizing conditions.

In order to stably perform the lamination, the surface temperature of the intermediate film sheet on the side to be adhered is preferably 50 to 130° C., more preferably 70 to 100° C.

Pressurization is preferable in the lamination. The pressurizing condition is preferably less than 2.0 kg/cm$^2$, more preferably in the range of 0.5 to 1.8 kg/cm$^2$, and further preferably in the range of 0.5 to 1.5 kg/cm$^2$.

Moreover, for the reflection film having a support, the support may be peeled off simultaneously with the lamination, or immediately after that, or immediately before that. Namely, a laminated intermediate film sheet obtained after the lamination may not have a support.

An example of manufacturing method of the laminated intermediate film sheet for laminated glass includes:

(1) a first process of sticking the reflection film to the surface of a first intermediate film sheet to thereby obtain a first laminate, and (2) a second process of sticking a second intermediate film sheet to a surface opposite to the surface to which first intermediate film sheet of the reflection film in the first laminate has been stuck.

In the first process, a reflection film is stuck with the first intermediate film sheet and the support is peeled off, and in the second process, the second intermediate film sheet is stuck to the surface from which the support has been peeled off.

A laminated intermediate film sheet for laminated glass not including the support can be manufactured by the method, and the laminated glass not including a support can easily be produced using the laminated intermediate film sheet for laminated glass. In order to stably peel off the support without damage or the like, the temperature of the support when peeling off the support from the reflection film is preferably 40° C. or more, more preferably 40 to 60° C.

(Position of Site Having Combiner Function)

In the wind shield glass, a site having a combiner function, for example, the reflection film including the reflection layer and the retardation layer may be provided in any position, and is preferably provided so that a virtual image is displayed in a position easily recognized visually from an observer (for example, a driver) when being used as a head-up display system. For example, the position in which the site having a combiner function is provided may be determined from the relation between the position of driver's seat of a means of transport to be applied and the position in which a projector is to be placed.

<Projection Image Display System>

The member for projection image display can be used for displaying a projection image by the use in combination with a unit configured to emit projection light, such as a projector. Namely, the member for projection image display of the present invention can be used as a configuration member of a projection image display system. The projection image display system may be, for example, a projection image display device, may be one in which the member for projection image display and a unit configured to emit light are integrally combined, or may be one that is used as a combination of the member for projection image display and a unit configured to emit projection light.

In the present specification, the projection image means an image based on the projection of light from a projector used, which is not environmental scenery. The projection image may be an image of unicolor, or may be an image of multi or full color. The projection image may be an image derived from reflected light from the member for projection image display. When the member for projection image display includes a site having a combiner function, the projection image may be observed as a virtual image that seems floating up beyond the site having a combiner function of the member for projection image display, as viewed from an observer.

The projection light (incident light) in the projection image display is preferably p-polarized light that vibrates in the direction parallel to a plane of incidence. The incident light may be allowed to enter from the retardation layer side with respect to the reflection layer and may enter the reflection layer via the retardation layer. Namely, the retardation layer may be disposed on the incident light side relative to the reflection layer. Furthermore, the incident light is preferably entered at an oblique incident angle of 45° to 70° relative to the normal line of the member for projection image display. The Brewster's angle at the interface between glass having a refractive index of approximately 1.51 and the air having the refractive index of 1 is about 56°. Thus, by making p-polarized light incident in the range of the above angles, an image display, in which reflected light from the retardation layer surface is small relative to that from the reflection layer of incident light for projection image display and the influence of a double image is small, is possible. The angle is preferably 50° to 65°. At this time, a configuration may be such that the observation of a projection image can be performed, from the side of the incident light plane, at an angle of 45° to 70°, preferably 50° to 65° on the side opposite to the incident light side relative to the normal line of the retardation layer.

The incident light may enter from any direction such as upper, lower, left or right side of the member for projection image display, and the direction may be determined depending on the direction of an observer. For example, the incident light may enter the member at an oblique incident angle from a lower direction in use.

Figure 6:
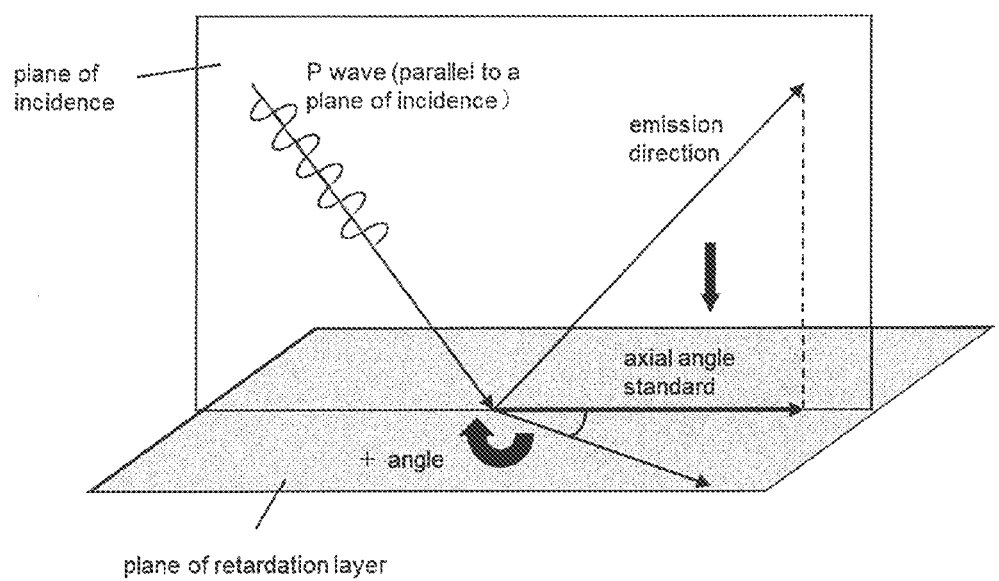
FIG. 6 is a diagram explaining the standard of an emission direction of light, a plane of incidence, a P wave and an axial angle (slow axis direction).

The member for projection image display of the present invention uses the cholesteric liquid crystal layer formed from a liquid crystal composition containing a discotic liquid crystal compound, and at the same time, uses the slow axis direction and front phase difference of the retardation layer by adjustment thereof, with the result that a clear projection image with a high light dose can be obtained in displaying an image by using p-polarized light as incident light. Furthermore, when the front phase difference of the retardation layer in the member for projection image display is 80 nm to 180 nm, the slow axis direction is preferably in the range of +110° to +160°, or −110° to −160° when defining an emission direction (travelling direction) of light as 0° (namely, the incident direction of light becomes +180° and) −180° on the line of intersection of the plane of incidence of incident p-polarized light and the retardation layer. When the front phase difference of the retardation layer in the member for projection image display is 250 nm to 400 nm, preferably 250 nm to 350 nm, the slow axis direction preferably is in the range of +20° to +70°, or −20° to −70° when defining an emission direction (travelling direction) of light as 0° on the line of intersection of the plane of incidence of incident p-polarized light and the retardation layer (refer to FIG. 6).

In the member for projection image display, there may be cases where the direction positioned on the upside (vertical upside) or the plane facing the observer side in use can be specified in manufacturing. For example, in a wind shield glass formed for a means of transport to be applied, usually, the direction positioned on the upside (vertical upside) and the plane facing an observer side in use can be specified. In this case, when a configuration in which incident p-polarized light is entered from the vertically lower direction of the member for projection image display is intended, combinations of the front phase difference and the slow axis direction below are preferable from the above-described viewpoint: when the front phase difference of the retardation layer is 80 nm to 180 nm, the slow axis direction is in the range of +110° to +160° or −110° to −160° with respect to the vertically upward direction of the member for projection image display in use; when the front phase difference of the retardation layer is 250 nm to 400 nm, and preferably 250 nm to 350 nm, the slow axis direction is in the range of +20° to +70° or −20° to −70° with respect to the vertically upward direction of the member for projection image display in use.

Note that, in the above explanation, + and − are defined regarding the slow axis, and means the clockwise direction and the counterclockwise direction when fixing an observation position. A preferable direction depends on the helical sense of the cholesteric liquid crystal layer of the member for projection image display. For example, when the helical sense of all cholesteric liquid crystal layers included in the member for projection image display is right-hand, the slow axis direction is preferably 110° to 160° or 20° to 70° clockwise when viewed from the retardation layer side with respect to the reflection layer. When the helical sense of all cholesteric liquid crystal layers included in the member for projection image display is left-hand, the slow axis direction is preferably 110° to 160° or 20° to 70° counterclockwise when viewed from the retardation layer side with respect to the reflection layer.

A projection image display system excellent in reflectance of each of RGB colors and whiteness degree (tint balance) can be provided by using the member for projection image display of the present invention. The mechanism will be explained below using the Poincare sphere.

FIG. 1 is a diagram showing change in a polarization state of incident light in a projection image display system using a member for projection image display in Example 1 to be described below. FIG. 1 is a diagram of the Poincare sphere when viewed from an S3 axis direction and shows the polarization state at respective interfaces.

First, p-polarized light of each of RGB colors is emitted from a display device. The polarization state of each light of RGB colors at this time is "1".

Note that, in the present specification, red light may be denoted as R, green light as G, and blue light as B. Furthermore, each of cholesteric liquid crystal layers of the member for projection image display including three cholesteric liquid crystal layers may be denoted as a Chr1 layer, Chr2 layer and Chr3 layer in order from the retardation layer side.

Red light is reflected in the Chr1 layer, and at this time, when the red light is right circularly polarized light, that is, when the polarization state of the red light exists on the S3 axis, the red light is most effectively reflected. Here, since the red light is put into a state of "2" R after passing through the retardation layer (being a negative A plate), the red light reaches the polarization state close to right circularly polarized light (close to the S3 axis) when entering the Chr1 layer, and is reflected with high reflectance.

Blue light is reflected in the Chr2 layer, and at this time, when the blue light is right circularly polarized light, that is, when the polarization state of the blue light exists on the S3 axis, the blue light is most effectively reflected. Here, since the blue light is put into a state of "2" B after passing through the retardation layer, and furthermore, is put into a state of "3" B after passing through the Chr1 layer, the blue light reaches the polarization state close to right circularly polarized light (close to the S3 axis) when entering the Chr2 layer, and is reflected with high reflectance.

Green light is reflected in the Chr3 layer, and at this time, when the green light is right circularly polarized light, that is, when the polarization state of the green light exists on the S3 axis, the green light is most effectively reflected. Here, since the green light is put into a state of "2" G after passing through the retardation layer, and moreover, is put into a state of "3" G after passing through the Chr1 layer, and furthermore, is put into a state of "4" G after passing through the Chr2 layer, the green light reaches the polarization state close to right circularly polarized light (close to the S3 axis) when entering the Chr3 layer, and is reflected with high reflectance.

As described above, in the configuration in Example 1, since light is reflected with high reflectance at each of RGB colors, it can be explained that brightness is high and whiteness degree (tint balance) becomes excellent. Other Examples can be explained in the same manner.

Figure 2:
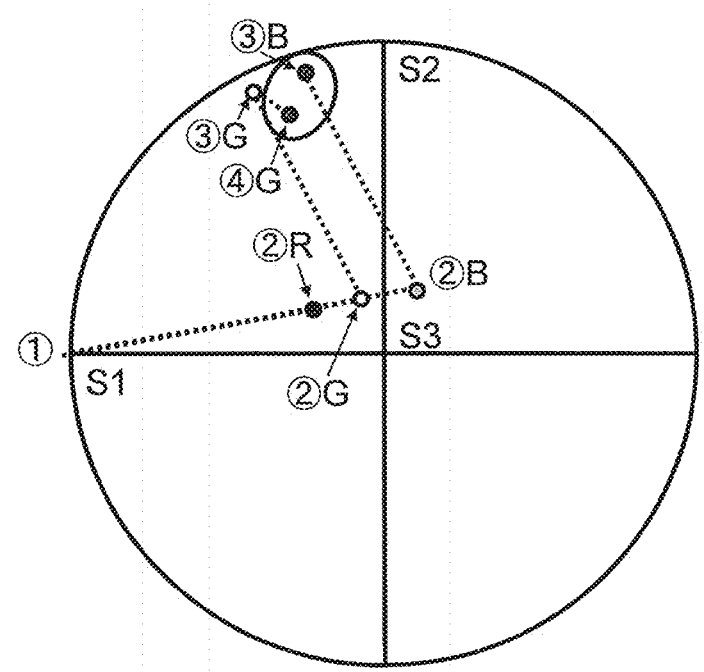
FIG. 2 is a diagram showing the change in a polarization state of incident light in a member for projection image display in Comparative Example 1, by using a Poincare sphere.

FIG. 2 is a diagram showing the change in a polarization state of incident light in a member for projection image display in Comparative Example 1 described below. FIG. 2 indicates that blue light and green light are in a polarization state far from right circularly polarized light (far from the S3 axis).

Figure 3:
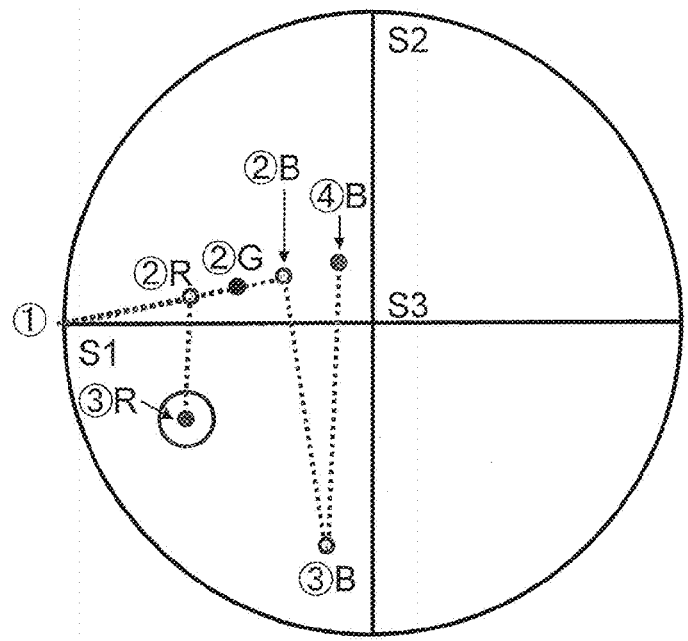
FIG. 3 is a diagram showing the change in a polarization state of incident light in a member for projection image display in Example 7, by using a Poincare sphere.

FIG. 3 indicates that red light is in a polarization state slightly far from right circularly polarized light (slightly far from S3 axis) in Example 7.

When taking, as an example, a configuration of using three cholesteric liquid crystals having different selective reflection central wavelengths for the reflection layer, also in the cases where combinations of dispositions of the reflection central wavelength (6 ways) and dispositions of the rod-like liquid crystal compound and the discotic liquid crystal compound (8 ways), and Re, Rth and the slow axis of the retardation layer are changed, in the same manner as examples of projection image display systems using member for projection image displays in the above Example and Comparative Example, superiority or inferiority of brightness and white degree (tint balance) can be determined by considering the polarization state of incident light on the Poincare sphere.

[Head-Up Display System]

A suitable example of the projection image display system includes a head-up display system.

Regarding head-up display systems using wind shield glass as a member for projection image display, Japanese Patent Laid-Open Nos. 02-141720, 10-96874 and 2003-98470, U.S. Pat. No. 5,013,134, Published Japanese translation of PCT patent application No. 2006-512622, and the like can be referred to.

[Projector]

In the present specification, a "projector" is a "device for projecting light or an image," and includes a "device for projecting a drawn image." In the head-up display system, preferably, the projector includes a drawing device and reflectively displays an image drawn on a small intermediate image screen (a real image) as a virtual image by using a combiner.

A drawing device of the projector is not particularly limited when the device has a function of projecting an image. Examples of the projectors include a liquid crystal projector, a DLP (Digital Light Processing) projector using a DMD (Digital Micromirror device), a GLV (Grating Light Valve) projector, a LCOS (Liquid Crystal on Silicon) projector, a CRT projector, and the like. The DLP projector and the GLV (Grating Light Valve) projector may be one using MEMS (Microelectromechanical systems).

A laser light source, an LED, a discharge tube, and the like can be used as a light source of the projector. The projector may include a reflecting mirror that adjusts light path of projection light formed in the drawing device, and the like.

As described above, preferably, p-polarized light is allowed to enter the member for projection image display to thereby form a projection image. When the light emitted from a projector is not linearly polarized light, a linearly polarizing film may be used while being arranged on the light emission side of the projector, or the light may be made into linearly polarized light in a light path from the projector to the member for projection image display.

The member for projection image display of the present invention is useful, in particular, in a head-up display system used in combination with a projector using a light source such as laser, LED or OLED not having a continuous emission wavelength in the visible light region. This is because the central wavelength of selective reflection of the cholesteric liquid crystal layer can be adjusted in accordance with respective emission wavelengths. Furthermore, the member for projection image display can also be used for projection of a display in which display light is polarized, such as an LCD (liquid crystal display) and OLED.

EXAMPLES

Hereinafter, the present invention will be explained more specifically while referring to Examples. Materials, reagents, substance amounts and ratios thereof, operations and the like shown in the following Examples can suitably be modified as long as they do not deviate from the purport of the present invention. Accordingly, the scope of the present invention is not limited to the following Examples.

(Formation of First Cholesteric Liquid Crystal Layer)

A PET film (manufactured by FUJIFILM Corporation, thickness: 75 μm) was prepared as a temporary support, and rubbing treatment was continuously subjected to the PET film. The direction of the rubbing treatment was set to be parallel to the longitudinal direction of the film.

A composition having composition below was dissolved in methyl ethyl ketone (MEK) while adjusting the concentration so as to give a dry thickness of 3.5 μm. The application liquid was applied with a bar onto the temporary support obtained by performing the rubbing treatment, and heat aging was performed on the applied film at 85° C. for 1 minute to thereby give a uniform alignment state. After that, the applied film was held at 55° C., which was irradiated with ultraviolet rays at 300 mJ/cm² by using a metal halide lamp, with the result that a first cholesteric liquid crystal layer (CLC) was formed.

(Composition for Forming a First Cholesteric Liquid Crystal Layer)

| | |
|---|---:|
| rod-like liquid crystal compound 1 | 83 parts by mass |
| rod-like compound 18-1 | 15 parts by mass |
| rod-like compound 18-2 | 2 parts by mass |
| fluorine-based horizontal alignment agent 1 | 0.05 parts by mass |
| fluorine-based horizontal alignment agent 2 | 0.01 parts by mass |
| dextrorotatory chiral agent LC756 (manufactured by BASF) | (approximately 6.7 parts by mass) |
| an amount giving the reflection central wavelength described in Table 1 | |
| polyfunctional monomer A-TMMT (manufactured by Shin-Nakamura Chemical Co., Ltd.) | 1 part by mass |
| polymerization initiator IRGACURE819 (manufactured by BASF) | 3 parts by mass | rod-like liquid crystal compound 1

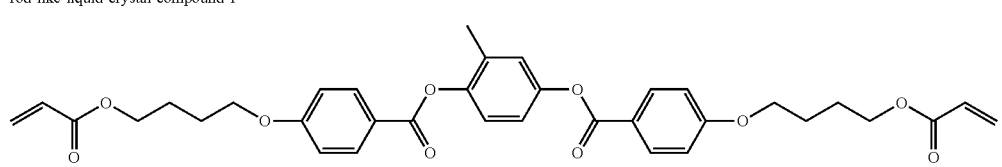

rod-like liquid crystal compound 18-1

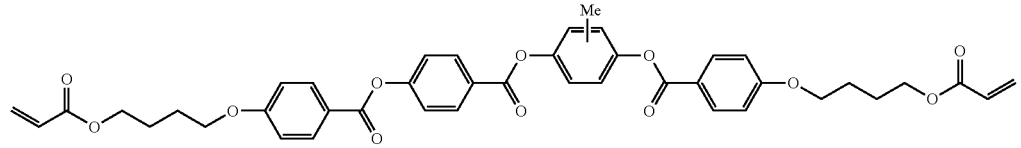

rod-like liquid crystal compound 18-2

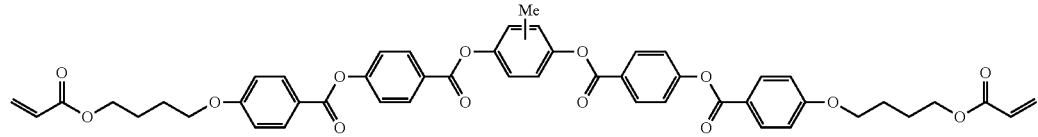

fluorine-based horizontal alignment agent 1

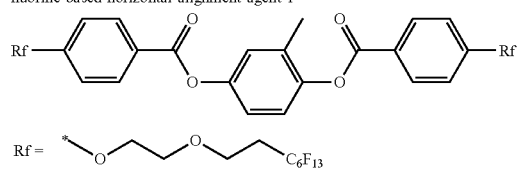

fluorine-based horizontal alignment agent 2

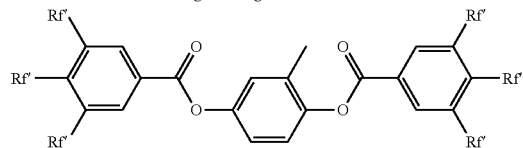

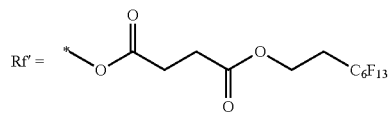

(Formation of Second Cholesteric Liquid Crystal Layer)

A second cholesteric liquid crystal layer (CLC) was formed according to the same procedure as the above (formation of a first cholesteric liquid crystal layer) except the dry thickness was changed from 3.5 µm to 4.1 µm, and the use amount of the dextrorotatory chiral agent LC756 (manufactured by BASF) from approximately 6.7 parts by mass to approximately 4.8 parts by mass.

(Formation of Third Cholesteric Liquid Crystal Layer)

A third cholesteric liquid crystal layer (CLC) was formed according to the same procedure as the above (formation of a first cholesteric liquid crystal layer) except the dry thickness was changed from 3.5 µm to 4.9 µm, and the use amount of the dextrorotatory chiral agent LC756 (manufactured by BASF) from approximately 6.7 parts by mass to approximately 3.5 parts by mass.

(Formation of Fourth Cholesteric Liquid Crystal Layer)

First, as an alignment layer, SUNEVER SE-130 (manufactured by Nissan Chemical Industries, Ltd.) was dissolved in N-methyl pyrrolidone and the concentration was then adjusted to give a dry thickness of 0.5 µm, which was applied with a bar onto a glass plate, and after that, the resultant applied material was heated at 100° C. for 5 minutes and at 250° C. for 1 hour. Furthermore, a rubbing treatment on the surface was performed to give an alignment layer.

Subsequently, a solute having a composition below was dissolved in MEK while adjusting the concentration so as to give a dry thickness of 3.4 µm, and thus an application liquid for forming a fourth cholesteric liquid crystal layer containing a discotic liquid crystal compound was prepared. The application liquid was applied with a bar onto the alignment layer, a solvent was vaporized by holding the resultant applied film at 70° C. for 2 minutes, and then heat aging was performed at 100° C. for 4 minutes to thereby give a uniform alignment state.

After that, the applied film was held at 55° C., which was irradiated with ultraviolet rays by using a high-pressure mercury lamp under a nitrogen atmosphere, with the result that a fourth cholesteric liquid crystal layer (DLC) was formed.

(Solute Composition of Application Liquid for Forming Fourth Cholesteric Liquid Crystal layer)

| | |
|---|---|
| discotic liquid crystal compound (Compound 101) | 56 parts by mass |
| discotic liquid crystal compound (Compound 102) | 14 parts by mass |
| alignment auxiliary agent (Compound 4) | 1 part by mass |
| alignment auxiliary agent (Compound 5) | 1 part by mass |

| | |
|---|---|
| polymerization initiator (Compound 6) | 3 parts by mass |
| chiral agent (Compound 103) | 4.6 parts by mass |

Compound 101

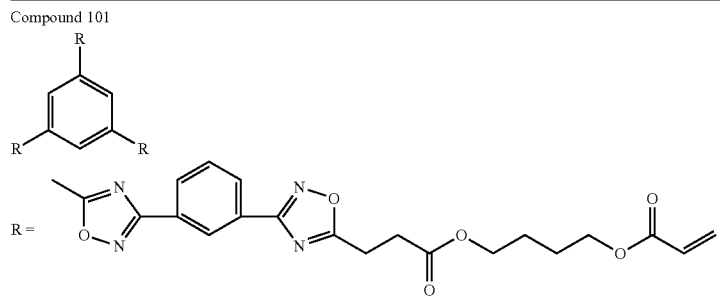

Compound 102

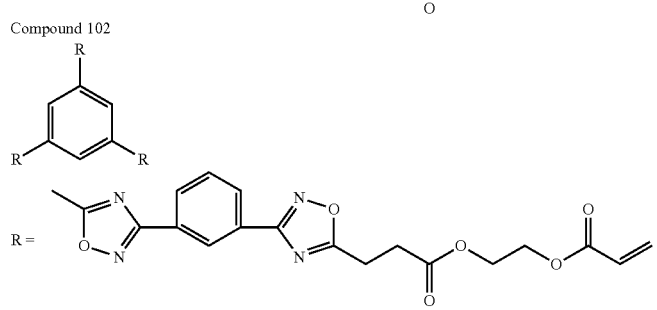

Compound 103

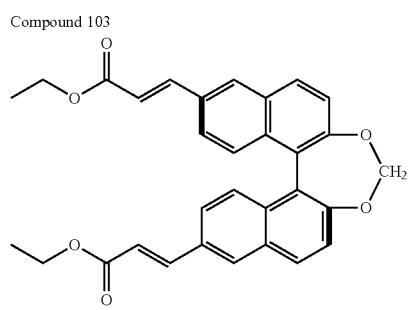

Compound 4 (a mixture of two compounds having different substitution sites of a methyl group in a trimethyl-substituted benzene ring in a structural formula below.
Mixing ratio of two compounds: 50:50 (mass ratio))

(Formation of Fifth Cholesteric Liquid Crystal Layer)

A fifth cholesteric liquid crystal layer (DLC) was formed according to the same procedure as the above (formation of a fourth cholesteric liquid crystal layer) except the dry

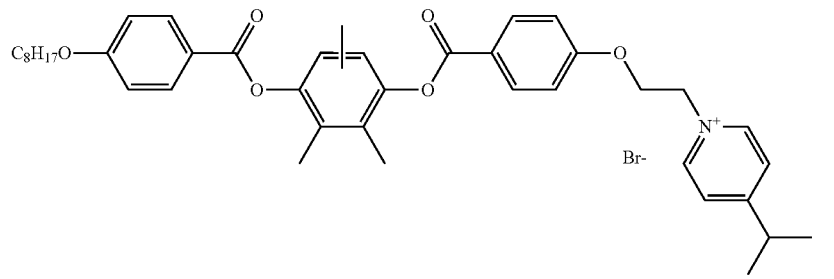

Compound 5

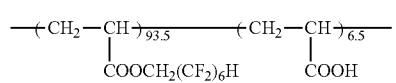

Compound 6

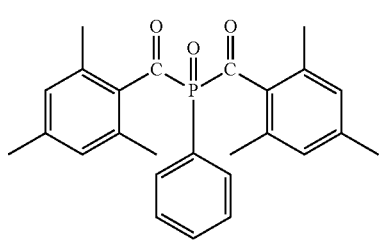

thickness was changed from 3.4 μm to 4.0 μm, and the use amount of the chiral agent (compound 103) from approximately 4.6 parts by mass to approximately 3.3 parts by mass.
(Formation of Sixth Cholesteric Liquid Crystal Layer)

A sixth cholesteric liquid crystal layer (DLC) was formed according to the same procedure as the above (formation of a fourth cholesteric liquid crystal layer) except the dry thickness was changed from 3.4 μm to 4.8 μm, and the use amount of the chiral agent (compound 103) from approximately 4.6 parts by mass to approximately 2.3 parts by mass.
(Production of First Retardation Layer)
<Preparation of Support>

TD80UL (manufactured by FUJIFILM Corporation) was used as a support (temporary support).
<Formation of Alignment Layer>

An alignment film application liquid having a composition below was continuously applied with a #14 wire bar directly onto the surface of the above prepared support without any saponification treatment. An alignment film was formed by drying the resultant product by warm air of 60° C. for 60 seconds, and additionally by warm air of 100° C. for 120 seconds.
Composition of Application Liquid for Forming Alignment Film

| modified polyvinyl alcohol described below | 10 parts by mass |
|---|---|
| water | 371 parts by mass |
| methanol | 119 parts by mass |
| glutaric aldehyde | 0.5 parts by mass | modified polyvinyl alcohol

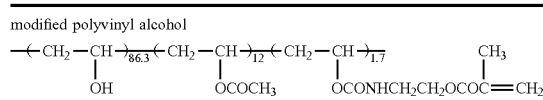

<Formation of Retardation Layer>

Subsequently, a solute having a composition below was dissolved in MEK while adjusting the concentration so as to give a dry thickness of 1.1 μm, and thus an application liquid was prepared. The application liquid was applied with a bar onto the alignment layer, a solvent was vaporized by holding the resultant applied film at 85° C. for 2 minutes, and then heat aging was performed at 100° C. for 4 minutes to thereby give a uniform alignment state. Note that the discotic compound was vertically aligned relative to the support plane.

After that, the applied film was held at 80° C., which was irradiated with ultraviolet rays by using a high-pressure mercury lamp under a nitrogen atmosphere with the result that a first retardation layer was formed. When measuring dependency of Re on a light incident angle by using an automatic birefringence meter (KOBRA-21ADH, manufactured by Oji Scientific Instruments), Re was 140 nm and Rth was −70 nm at a wavelength of 550 nm.

(Solute Composition of Application Liquid for Forming First Retardation Layer)

| discotic liquid crystal compound (Compound 101) | 35 parts by mass |
|---|---|
| discotic liquid crystal compound (Compound 102) | 35 parts by mass |
| alignment auxiliary agent (Compound 4) | 1 part by mass |
| alignment auxiliary agent (Compound 5) | 1 part by mass |
| polymerization initiator (Compound 6) | 3 parts by mass |

(Production of Second Retardation Layer)

A second retardation layer was formed in the same procedure as that in the first retardation layer except the application liquid for forming the retardation layer was changed so as to give a dry thickness of 2.3 μm. The second retardation layer had Re of 300 nm and Rth of −150 nm.
(Production of Third Retardation Layer)
<Preparation of Support>

TD80UL (manufactured by FUJIFILM Corporation) was used as a support.
<Formation of Alignment Film>

An alignment film application liquid having a composition below was continuously applied with a #14 wire bar directly onto the surface of the prepared support without a saponification treatment. An alignment film was formed by drying the resultant product by warm air of 60° C. for 60 seconds, and additionally by warm air of 100° C. for 120 seconds
Composition of Application Liquid for Forming Alignment Film

| modified polyvinyl alcohol described above | 10 parts by mass |
|---|---|
| water | 371 parts by mass |
| methanol | 119 parts by mass |
| glutaric aldehyde | 0.5 parts by mass |

<Formation of Retardation Layer>

An application liquid A for a retardation layer described below was applied using a bar coater. Subsequently, the resultant applied material was subjected to heat aging at surface temperature of 60° C. for 30 seconds, and directly after that, was irradiated with ultraviolet rays of 290 mJ/cm² at surface temperature of 60° C. under air, by using an air-cooled metal halide lamp (manufactured by EYE GRAPHICS CO., LTD.) to thereby fix the alignment state. In the formed third retardation layer, rod-like liquid crystals were horizontally aligned and the slow axis direction was parallel to the rubbing direction, that is, the slow axis direction was orthogonal to the absorption axis direction of the polarizer. At this time, the thickness of the retardation layer was 1.3 μm. When measuring dependency of Re on a light incident angle using an automatic birefringence meter (KOBRA-21ADH, manufactured by Oji Scientific Instruments), Re was 135 nm and Rth was 66 nm at a wavelength of 550 nm.

Composition of application liquid A for retardation layer

| rod-like liquid crystal compound 1 | 80 parts by mass |
|---|---|
| rod-like liquid crystal compound 2 | 20 parts by mass |
| photopolymerization initiator (Irgacure 907, manufactured by BASF) | 3.0 parts by mass |
| sensitizer (Kayacure-DETX, manufactured by Nippon Kayaku Co., Ltd.) | 1.0 part by mass |

| Composition of application liquid A for retardation layer | |
|---|---|
| fluorine-containing compound A | 0.8 parts by mass |
| methyl ethyl ketone | 234 parts by mass | rod-like liquid crystal compound 1

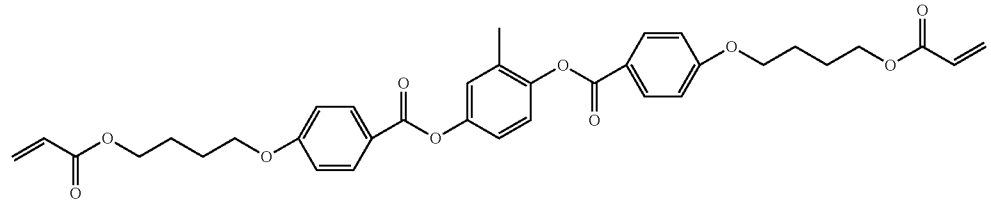 [SMILES: C=CC(=O)OCCCCOc1ccc(C(=O)Oc2ccc(OC(=O)c3ccc(OCCCCOC(=O)C=C)cc3)c(C)c2)cc1]

rod-like liquid crystal compound 2

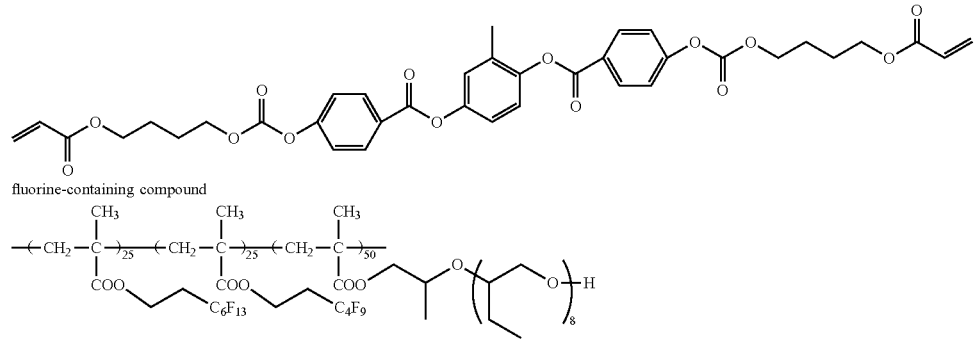

fluorine-containing compound (Production of Fourth Retardation Layer)

A fourth retardation layer was formed in the same procedure as that in the third retardation layer except the thickness was changed so as to be 2.6 μm. The fourth retardation layer had Re of 300 nm and Rth of 150 nm.

(Production of Fifth Retardation Layer)

A fifth retardation layer was formed in the same procedure as that in the third retardation layer except the thickness was changed so as to be 0.9 μm. The fifth retardation layer had Re of 100 nm and Rth of 50 nm.

(Production of Sixth Retardation Layer)

1. Synthesis of Cellulose Acylate

According to a saponification method of cellulose acetate described in Japanese Patent Laid-Open No. 2008-163193, paragraph [0121] and a method of aromatic acylation of cellulose acetate described in the gazette, paragraph [0124], cellulose acylate having a substitution degree of an acetyl group of 0.6, a substitution degree of a benzoyl group of 0.9, and a total substitution degree of 1.5 was synthesized.

2. Manufacturing of Cellulose Acylate Film (1) Preparation of Cellulose Acylate Solution A solution of the cellulose acylate synthesized by the above methods was prepared as follows.

<Preparation of Cellulose Acylate Solution>

Raw materials below were fed into a mixing tank, which were heated with stirring and dissolved to thereby prepare a solution having a cellulose acylate solution.

| cellulose acylate | 100 parts by mass |
|---|---|
| dichloromethane | 462 parts by mass |

(2) Manufacturing of Cellulose Acylate Film

The cellulose acylate solution thus prepared was cast using a band casting machine. A film having 15% by mass of remaining solvent was subjected to fixed-end uniaxial stretching at a temperature of glass transition temperature of −5° C. and a stretching ratio of 45% to thereby produce a cellulose acylate film having a thickness of 50 μm, with the result that a sixth retardation layer was obtained. Dependency of Re on a light incident angle was measured by using an automatic birefringence meter (KOBRA-21ADH, manufactured by Oji Scientific Instruments), and Re was 151 nm and Rth was 12 nm at a wavelength of 550 nm.

(Formation of Member for Projection Image Display in Example 1)

Figure 4:
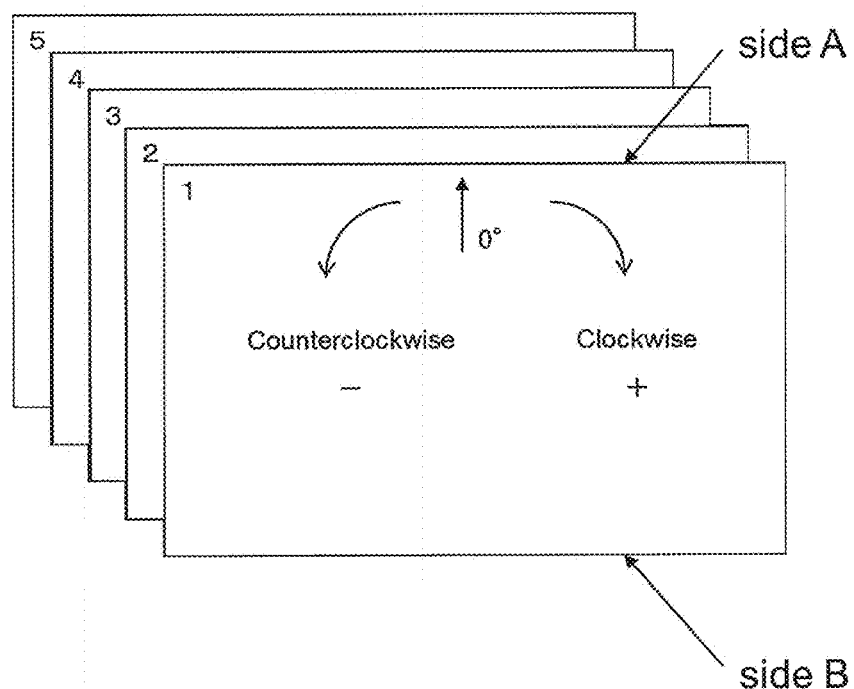
FIG. 4 is a diagram showing the standard of a laminating order and an axial angle (slow axis direction) of members for projection image display in Example and Comparative Example.

A member for projection image display was formed by the following procedures: the first retardation layer cut off in the same shape was stuck to a glass plate of 40 cm long, 25 cm wide and 2 mm thick by using an acrylic-based adhesive; then, the temporary support (TD80UL) was peeled off; thereon, the sixth cholesteric liquid crystal layer was stuck by using an acrylic-based adhesive; subsequently, the temporary support (PET film) was peeled off; thereon, the first cholesteric liquid crystal layer was stuck by using an acrylic-based adhesive; after that, the temporary support (PET film) was peeled off; thereon, the second cholesteric liquid crystal layer was stuck by using an acrylic-based adhesive, and then, the temporary support (PET film) was peeled off. Note that the sticking was performed so that, as shown in FIG. 4, when the direction parallel to the short side of glass is defined as 0 degree, as viewed from the glass side having a thickness of 2 mm, the slow axis of the first retardation layer becomes a direction of 120 degrees clockwise from the parallel direction.

(Formation of Members for Projection Image Display in Examples 2 to 7 and Comparative Examples 1 to 2

Members for projection image display in Examples 2 to 7 and Comparative Examples 1 to 2 were formed according to methods similar to that in Example 1, by using each of retardation layers and cholesteric liquid crystal layers, listed in Table.

Note that, since the sixth retardation layer, which was used in Example 2, was not formed on a temporary support, the layer was used as it was without peeling off a temporary support.
(Formation of Samples for Evaluating Light Transmittance of Member for Projection Image Display)

The size of the glass plate, retardation layer and cholesteric liquid crystal layer used for forming the member for projection image display was changed to 4 cm×4 cm, and samples for evaluating light transmittance in Examples, Comparative Examples, and a reference example were formed in the same method as that for forming the member for projection image display.
(Formation of Projection Image Display Systems in Examples 1 to 7, and Comparative Example 1)

Figure 5:
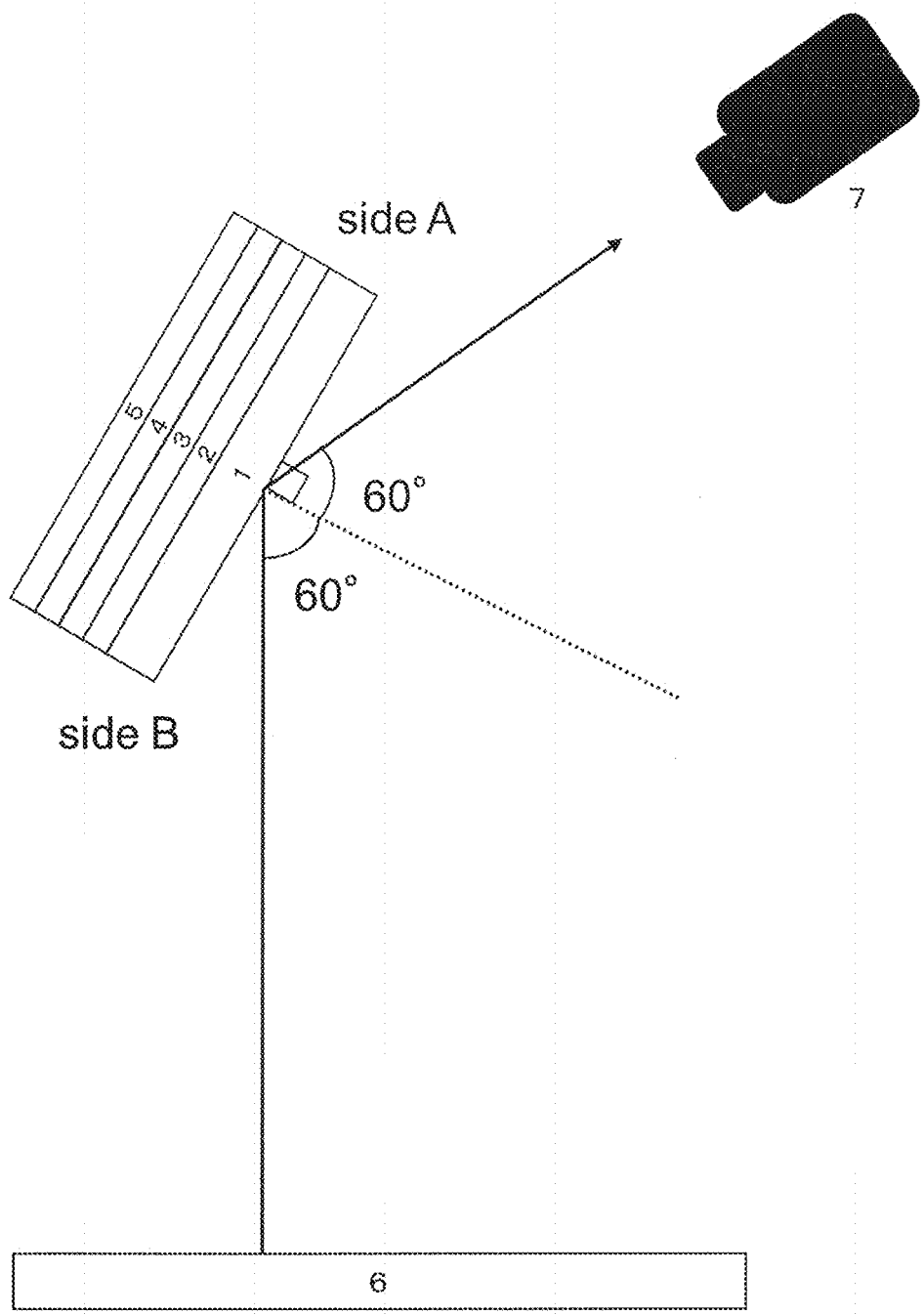
FIG. 5 is a diagram showing a disposition of a member for projection image display, a liquid crystal panel and a brightness meter, in evaluating a member for projection image display.

As shown in FIG. 5, a liquid crystal panel 23EA53VA (manufactured by LG Electronics) having white brightness of 200 cdm$^{-2}$ and chromaticity of x=0.32, y=0.32 was horizontally placed, and the member for projection image display in Example 1 was inclined by 60 degrees so that the long side was positioned in the lateral direction, the short side was positioned in the longitudinal direction and the side of glass having a thickness of 2 mm faced the downside, and an image of the liquid crystal panel was projected to the glass side. The long sides of the member for projection image display were placed so that, in FIG. 4, a side A was positioned on the upper side and a side B was positioned on the lower side. Note that the liquid crystal panel was placed so that polarized light of the projected image became p-polarized light (linearly polarized light in which the vibration plane of electric vector was in a direction parallel to the paper surface in FIG. 5 (parallel to the plane of incidence of light)).
(Formation of Projection Image Display System in Reference Example 1)

As shown in FIG. 5, a liquid crystal panel 23EA53VA (manufactured by LG Electronics) having white brightness of 200 cdm$^{-2}$ and chromaticity of x=0.32, y=0.32 was placed horizontally, and the member for projection image display in Example 1 was inclined by 60 degrees so that the long side was positioned in the lateral direction, the short side was positioned in the longitudinal direction and the side of glass having a thickness of 2 mm faced the downside, and an image of the liquid crystal panel was projected to the glass side. The long sides of the member for projection image display were placed so that, in FIG. 4, a side A was positioned on the upper side and a side B was positioned on the lower side. Note that the liquid crystal panel was placed so that polarized light of the projected image became s-polarized light (linearly polarized light in which the vibration plane of electric vector was in a direction perpendicular to the paper surface in FIG. 5).

Evaluation Method
(Light Transmittance)

Transmittance of the sample for evaluating light transmittance of the member for projection image display in the visible light region (380 to 780 nm) was measured using a spectrometer UV3150 (by Shimadzu Corporation), and evaluation was performed based on the standard below:

A: average of light transmittance in visible light region is 70% or more

B: average of light transmittance in visible light region is 50% or more and less than 70%

C: average of light transmittance in visible light region is less than 50%

As to brightness and whiteness, a white solid image was displayed on the liquid crystal panel and was measured using a brightness meter BM-5A (manufactured by Topcon Corporation), which was evaluated based on the standard below. At this time, as shown in FIG. 5, the brightness meter was placed in the direction rotated by 60 degrees, with respect to the normal line to the plane of a projected image display member, to the side opposite to the light incident direction in the plane of incidence of light. Furthermore, in order to eliminate polarized light dependency, measurements were performed while rotating the brightness meter by 0 degree and 90 degrees by setting the measurement light as the rotation axis, and the resultant values were averaged.
(Brightness)

A: 140 cdm$^{-2}$ or more

B: 100 cdm$^{-2}$ or more and less than 140 cdm$^{-2}$

C: less than 100 cdm$^{-2}$ (Whiteness)

When denoting measured chromaticity as x=x1, y=y1, and denoting the absolute value of a variation width relative to the chromaticity of the liquid crystal panel of x=0.32, y=0.32 as Δx=|x1−0.32|, Δy=|y1−0.32|, A: Δx is less than 0.2 and Δy is less than 0.2

B: a larger value of Δx and Δy is 0.2 or more and less than 0.5

C: a larger value of Δx and Δy is 0.5 or more
(Double Image)

A white character on a black background was displayed on the liquid crystal panel, and visibility of the character was visually evaluated. The standard of evaluation was determined as follows.

A: character can be read under room lighting and in a dark state room

B: character can be recognized and read under room lighting, but is difficult to read in a dark state room (unacceptable level)

C: character is difficult to read both under room lighting and in a dark state room Results are shown in Table 1.

TABLE 1

| | | Example 1 | Example 2 | Example 3 | Example 4 | Example 5 | Example 6 | Example 7 |
|---|---|---|---|---|---|---|---|---|
| | | \multicolumn{7}{c}{order of configuration} |
| | | \multicolumn{7}{c}{Incident polarized light} |
| | | P | P | P | P | P | P | P |
| Base material | | \multicolumn{7}{c}{Glass plate of 2 mm thickness} |
| Retardation layer | Retardation layer used | first | sixth | second | fourth | third | first | fifth |
| | Axial angle (degrees) | 120 | 150 | 30 | 60 | 150 | 120 | 135 |
| | Re | 140 nm | 150 nm | 300 nm | 300 nm | 135 nm | 140 nm | 100 nm |
| | Rth | −70 nm | 0 nm | −150 nm | 150 nm | 66 nm | −70 nm | 50 nm |

TABLE 1-continued

| | | | | | | | | | |
|---|---|---|---|---|---|---|---|---|---|
| Reflection layer | Reflection layer used | Chr1 | sixth | third | fourth | first | second | fifth | fifth |
| | | Chr2 | first | fourth | fifth | second | sixth | first | third |
| | | Chr3 | second | fifth | sixth | sixth | first | sixth | first |
| | Cholesteric liquid crystal material | Chr1 | DLC | CLC | DLC | CLC | CLC | DLC | DLC |
| | | Chr2 | CLC | DLC | DLC | CLC | DLC | CLC | CLC |
| | | Chr3 | CLC | DLC | DLC | DLC | CLC | DLC | CLC |
| | Central wavelength of reflection to | Chr1 | 770 | 770 | 540 | 540 | 640 | 640 | 640 |
| | | Chr2 | 540 | 540 | 640 | 640 | 770 | 540 | 770 |
| | | Chr3 | 640 | 640 | 770 | 770 | 540 | 770 | 540 |
| Performance | Light transmittance | | A | A | A | A | A | A | A |
| | Brightness | | A | A | A | A | A | A | B |
| | Whiteness (tint balance) | | A | A | A | A | A | A | B |
| | Double image | | A | A | A | A | A | A | A |

| | | | order of configuration | | | | | |
|---|---|---|---|---|---|---|---|---|
| | | | Comparative example 1 | Comparative example 2 | Comparative example 3 | Comparative example4 | Comparative example 5 | Reference example 1 |
| | | | | | Incident polarized light | | | |
| | | | P | P | P | P | P | S |
| Base material | | | | | Glass plate of 2 mm thickness | | | |
| Retardation layer | Retardation layer used | | first | third | third | third | third | first |
| | Axial angle (degrees) | | 120 | 0 | 45 | 90 | 135 | 120 |
| | Re | | 140 nm | 135 nm | 135 nm | 135 nm | 135 nm | 140 nm |
| | Rth | | −70 nm | 66 nm | 66 nm | 66 nm | 66 nm | −70 nm |
| Reflection layer | Reflection layer used | Chr1 | third | first | first | first | first | sixth |
| | | Chr2 | first | second | second | second | second | first |
| | | Chr3 | second | third | third | third | third | second |
| | Cholesteric liquid crystal material | Chr1 | CLC | CLC | CLC | CLC | CLC | DLC |
| | | Chr2 | CLC | CLC | CLC | CLC | CLC | CLC |
| | | Chr3 | CLC | CLC | OLD | CLC | CLC | CLC |
| | Central wavelength of reflection to | Chr1 | 770 | 540 | 540 | 540 | 540 | 770 |
| | | Chr2 | 540 | 640 | 640 | 640 | 640 | 540 |
| | | Chr3 | 640 | 770 | 770 | 770 | 770 | 640 |
| Performance | Light transmittance | | A | A | A | A | A | A |
| | Brightness | | C | C | C | C | C | C |
| | Whiteness (tint balance) | | C | C | B | C | C | B |
| | Double image | | A | A | A | A | A | C |

As is apparent from Table 1, in Comparative Example using CLC for all three layers of the cholesteric layer, brightness was low and excellent tint balance was not obtained at the observation angle, whereas in Examples 1 to 7 including DLC, results excellent in brightness and tint balance were obtained. Note that double image was observed in reference example 1 in which s-polarized light was used as incident light.

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

KEY TO THE NUMBERS 1 glass plate
2 retardation layer
3 Chr1 layer
4 Chr2 layer
5 Chr3 layer
6 liquid crystal panel
7 brightness meter

The invention claimed is:

1. A member for projection image display, comprising a reflection layer and a retardation layer; wherein
the reflection layer comprises a cholesteric liquid crystal layer exhibiting selective reflection in a visible light region, and the cholesteric liquid crystal layer is a layer formed from a liquid crystal composition comprising a discotic liquid crystal compound; and
a front phase difference of the retardation layer is in a range of 50 nm to 400 nm,
wherein the discotic liquid crystal compound is a polymerizable liquid crystal compound.

2. The member for projection image display according to claim 1, wherein the reflection layer comprises two or more cholesteric liquid crystal layers each exhibiting selective reflection in a visible light region, and comprises a cholesteric liquid crystal layer formed from a liquid crystal composition comprising a rod-like liquid crystal compound.

3. The member for projection image display according to claim 1, wherein the reflection layer comprises three layers or more cholesteric liquid crystal layers, and the three or more cholesteric liquid crystal layers exhibit central wavelengths of selective reflection that are different from one another.

4. The member for projection image display according to claim 3, comprising a cholesteric liquid crystal layer having a central wavelength of selective reflection in 490 nm to 570 nm, a cholesteric liquid crystal layer having a central wavelength of selective reflection in 580 nm to 680 nm, and a cholesteric liquid crystal layer having a central wavelength of selective reflection in 700 nm to 830 nm.

5. The member for projection image display according to claim 4, wherein helical senses of all cholesteric liquid crystal layers are the same.

6. The member for projection image display according to claim 1, wherein a total thickness of layers positioned on the retardation layer side relative to the reflection layer is 0.5 mm or more.

7. The member for projection image display according to claim 1, wherein the reflection layer, the retardation layer and a base material are laminated in this order.

8. The member for projection image display according to claim 7, comprising a first base material, a second base material and an intermediate layer between the first base material and the second base material, wherein the reflection layer and the retardation layer are comprised in at least a part of the intermediate layer, and the first base material, the reflection layer, the retardation layer and the second base material are laminated in this order.

9. The member for projection image display according to claim 8, wherein each of the first base material and the second base material is made of glass, and the member for projection image display is wind shield glass.

10. The member for projection image display according to claim 8, wherein the intermediate layer comprises a resin film.

11. The member for projection image display according to claim 10, wherein the resin film comprises polyvinyl butyral.

12. A projection image display system which comprises the member for projection image display according to claim 1, wherein:
the retardation layer is disposed on an incident light side relative to the reflection layer; and
the incident light is p-polarized light that vibrates in a direction parallel to a plane of incidence.

13. The projection image display system according to claim 12, wherein, when defining an emission direction of light on a line of intersection of the plane of incidence and the retardation layer as 0 degree, a slow axis direction of the retardation layer is in a range of +110° to +160°, or −110° to −160°, and a front phase difference of the retardation layer is 80 nm to 180 nm.

14. The projection image display system according to claim 13, wherein helical senses of all cholesteric liquid crystal layers contained in the reflection layer are right-hand, and when defining an emission direction of light on a line of intersection of the plane of incidence and the retardation layer as 0 degree, a slow axis direction of the retardation layer is in a range of 110° to 160° clockwise when viewed from the retardation layer side relative to the reflection layer.

15. The projection image display system according to claim 13, wherein helical senses of all cholesteric liquid crystal layers contained in the reflection layer are left-hand, and when defining an emission direction of light on a line of intersection of the plane of incidence and the retardation layer as 0 degree, a slow axis direction of the retardation layer is in a range of 110° to 160° counterclockwise when viewed from the retardation layer side relative to the reflection layer.

16. The projection image display system according to claim 12, wherein, when defining an emission direction of light on a line of intersection of the plane of incidence and the retardation layer as 0 degree, a slow axis direction of the retardation layer is in a range of +20° to +70°, or −20° to −70°, and a front phase difference of the retardation layer is 250 nm to 400 nm.

17. The projection image display system according to claim 16, wherein helical senses of all cholesteric liquid crystal layers contained in the reflection layer are right-hand, and when defining an emission direction of light on a line of intersection of the plane of incidence and the retardation layer as 0 degree, a slow axis direction of the retardation layer is in a range of 20° to 70° clockwise when viewed from the retardation layer side relative to the reflection layer.

18. The projection image display system according to claim 16, wherein helical senses of all cholesteric liquid crystal layers contained in the reflection layer are left-hand, and when defining an emission direction of light on a line of intersection of the plane of incidence and the retardation layer as 0 degree, a slow axis direction of the retardation layer is in a range of 20° to 70° counterclockwise when viewed from the retardation layer side relative to the reflection layer.

19. The projection image display system according to claim 12, wherein the incident light enters the member at an angel of 45° to 70° relative to a normal line of the member for projection image display.

20. The projection image display system according to claim 12, wherein the incident light enters the member from a lower direction of the member for projection image display in use.

21. The member for projection image display according to claim 1,
wherein the reflection layer comprises two or more cholesteric liquid crystal layers each exhibiting selective reflection in a visible light region, and
wherein each cholesteric liquid crystal layer in the two or more cholesteric liquid crystal layers is a layer formed from a liquid crystal composition comprising a discotic liquid crystal compound, or the two or more cholesteric liquid crystal layers comprise a layer formed from a liquid crystal composition comprising a discotic liquid crystal compound and a cholesteric liquid crystal layer formed from a liquid crystal composition comprising a rod-like liquid crystal compound.

* * * * *